United States Patent [19]
Himmel et al.

[11] Patent Number: 6,037,934
[45] Date of Patent: Mar. 14, 2000

[54] NAMED BOOKMARK SETS

[75] Inventors: Maria Azua Himmel; Herman Rodriguez, both of Austin, Tex.

[73] Assignee: International Business Machines Corporation, Armonk, N.Y.

[21] Appl. No.: 08/976,406

[22] Filed: Nov. 21, 1997

[51] Int. Cl.[7] .............................. G06F 3/00; G06F 15/16
[52] U.S. Cl. ..................... 345/335; 345/357; 345/333; 345/356; 707/501; 709/203; 709/205; 709/217
[58] Field of Search ..................... 345/357, 335, 345/329, 331, 353, 333, 356; 395/200.35, 200.33, 200.47; 707/501

[56] References Cited

U.S. PATENT DOCUMENTS

| | | | |
|---|---|---|---|
| 5,500,929 | 3/1996 | Dickinson | 345/356 |
| 5,615,346 | 3/1997 | Gerken | 345/341 |
| 5,625,781 | 4/1997 | Cline et al. | 395/355 |
| 5,706,507 | 1/1998 | Schloss | 707/104 |
| 5,742,768 | 4/1998 | Gennaro et al. | 295/200.33 |
| 5,781,189 | 5/1995 | Holleran et al. | 345/335 |
| 5,801,702 | 3/1995 | Dolan et al. | 345/357 |
| 5,864,676 | 11/1996 | Beer et al. | 395/200.59 |

FOREIGN PATENT DOCUMENTS 2328300A  10/1998  United Kingdom ............ G06F 17/30

OTHER PUBLICATIONS

Gopher Bookmarks: How To Make Them and What They Can Do For you. http://www—lis.gseis.ucla.edu/Lab/unote25.html, Jun. 4, 1997.

Netscape 2.0—Bookmark Information From Netscape. http://www.lib.utah.edu/navigator/netscape/bkmk20/nsbkmk20.html, Jun. 4, 1997.

Rucker, J.: Polanco, J.J., ISSN 00010782, Siteseer:perosnalized navigation for the Web (Journal Paper) Copyright 1997, IEEE.

High Marks For SmartMarks A Review Article. (Journal Paper) ISSN 10875301, Copyright 1997, IEEE, Choinski, E.M.

Primary Examiner—Raymond J. Bayerl
Assistant Examiner—Cuong T. Thai
Attorney, Agent, or Firm—Jeffrey S. LaBaw

[57] ABSTRACT

Access to the Internet is provided using a plurality of bookmark sets. A plurality of bookmark sets are stored in a computer system having a browser, each bookmark set including a respective set of Uniform Resource Locators (URLs). One of the bookmark sets is designated as an active bookmark set in the browser. Browser based access to the Internet is allowed according to the URLs in the active bookmark set. When a request to retrieve an Internet file from a designated URL is detected, e.g., by hyperlink, the designated URL is checked against the URLs in the active bookmark set. Only if there is a match between the designated URL and a respective URL in the active bookmark set is the request allowed to proceed. The creation of as well as other actions on a bookmark set is associated with one or more passwords.

25 Claims, 14 Drawing Sheets

NAMED BOOKMARK SETS

BACKGROUND OF THE INVENTION

This invention relates generally to information retrieval in a computer network. More particularly, it relates to an improved method for providing a set of bookmarks in a browser for retrieving Web pages in an Internet environment.

It is well known to couple a plurality of computer systems into a network of computer systems. In this way, the collective resources available within the network may be shared among users, thus allowing each connected user to enjoy resources which would not be economically feasible to provide to each user individually. With the growth of the Internet, sharing of computer resources has been brought to a much wider audience. The Internet has become a cultural medium in today's society for both information and entertainment. Government agencies employ Internet sites for a variety of informational purposes. For many companies, one or more Internet sites are an integral part of their business; these sites are frequently mentioned in the companies' television, radio and print advertising.

The World Wide Web, or simply "the Web", is the Internet's multimedia information retrieval system. It is the most commonly used method of transferring data in the Internet environment. Other methods exist such as the File Transfer Protocol (FTP) and Gopher, but have not achieved the popularity of the Web. Client machines accomplish transactions to Web servers using the Hypertext Transfer Protocol (HTTP), which is a known application protocol providing users access to files, e.g., text, graphics, images, sound, video, using a standard page description language known as the Hypertext Markup Language (HTML). HTML provides basic document formatting and allows the developer to specify "links" to other servers and files. In the Internet paradigm, a network path to a server is identified by a Uniform Resource Locator (URL) having a special syntax for defining a network connection.

Retrieval of information is generally achieved by the use of an HTML-compatible "browser", e.g., Netscape Navigator, at a client machine. When the user of the browser specifies a link via a URL, the client issues a request to a naming service to map a hostname in the URL to a particular network IP address at which the server is located. The naming service returns a list of one or more IP addresses that can respond to the request. Using one of the IP addresses, the browser establishes a connection to a server. If the server is available, it returns a document or other object formatted according to HTML. Web browsers have become the primary interface for access to many network and server services.

The entry of the URL in the entry field of a browser can be a difficult task for many users. While the URL for the main Web page of a major company can be relatively brief, e.g., www.ibm.com, subsidiary pages can have very lengthy URLs in, at least to the average user, an arcane syntax. Recognizing the difficulties involved, the developers of browsers have provided one useful means of returning to a favorite URL, by the creation of user stored "bookmarks" in the browser.

Web browsers offer many options in the user interface for creating a bookmark list. Basic options let the user add and access a page through a pop-up menu on the location toolbar or through a menu pulldown from the main menu bar. A simple way to add a bookmark for a favorite page is to enter the URL to travel to the page, once there, open the Bookmarks menu and choose the Add Bookmarks selection. This set of actions adds the URL of the current page as an item in the Bookmarks menu.

Once created, bookmarks offer a means of page retrieval. The user can cause the browser to display his bookmark list and select among his bookmarks to go directly to a favorite page. Thus, the user is not forced to enter a lengthy URL nor retrace the original tortuous route through the Internet by which he may have arrived at the Web site. Once a bookmark is added to a bookmark list, in general, the bookmark becomes a permanent part of the browser until removed. The permanence and accessibility of bookmarks have made them a valuable means for personalizing a user's Internet access through the browser.

Yet despite their usefulness, the current arrangement of bookmarks is not without its flaws. As the numbers of web sites and web pages on these sites have increased dramatically, so has the number of bookmarks that a typical web browser user maintains on his browser. It is not uncommon that hundreds of bookmarks be stored in a bookmark file after a few weeks of web browsing. While folders in some browsers have helped the user group his bookmarks by category, in reality, the bookmark file is one huge list of bookmarks, all accessible to the user through the browser. This present invention is concerned with providing structure and additional function to this amorphous entity, the bookmark file.

One problem not addressed by the current bookmark schemes is access control. In the current browser environment, all bookmarks are accessible to the user at all times. There are certain environments, e.g., a work environment or a home environment with young children, in which this power is not an unmixed blessing.

The most common way of adding bookmarks to the bookmark file in the browser is manually intensive. Each bookmark is added one at a time. A user visits a web site, then selects that site as a bookmark entry and, if desired, categorizes it manually. Furthermore, the current technology used in browsers to update bookmarks, i.e. removing the old address and entering the new one, is very slow and inefficient.

Bookmarks are currently used merely as an aid for navigation on a site by site basis. Once at a web site, the bookmark list is unused in navigation until a new web site in the user's bookmark list is desired. Bookmarks lend a uniform navigation means to an otherwise unordered Web; it is unfortunate that their utility has been untapped for intrasite navigation.

These problems as well as others are addressed in various embodiments of the present invention.

SUMMARY OF THE INVENTION

Therefore, it is an object of the invention to improve the access control of a browser of the Internet.

It is another object of the invention to facilitate the management of bookmarks in the browser.

It is another object of the invention to improve the presentation and organization of bookmarks in a browser.

It is another object of the invention to flexibly configure a browser for users with different permissions.

These and other objects are accomplished by providing access to the Internet using a plurality of bookmark sets. A plurality of bookmark sets are stored in a computer system having a browser, each bookmark set including a respective set of Uniform Resource Locators (URLs). One of the bookmark sets is designated as an active bookmark set in the browser. Browser based access to the Internet is allowed according to the URLs in the active bookmark set. When a request to retrieve an Internet file from a designated URL is detected, e.g., by hyperlink, the designated URL is checked against the URLs in the active bookmark set. Only if there is a match between the designated URL and a respective URL in the active bookmark set is the request allowed to proceed.

In one preferred embodiment, the creation of a bookmark set is associated with one or more passwords. The entry of the associated password is required to make the bookmark set the active bookmark set in the browser, to modify the bookmark set or perform other actions related to the bookmark set. Since the bookmark set is a single entity an attribute can be changed for all of the bookmarks in a selected bookmark set in a single operation. Other operations such as deletion of a bookmark set can similarly be accomplished in a single operation. In one preferred embodiment, when the list of bookmark sets is displayed, only the bookmarks of the active bookmark set are displayed.

BRIEF DESCRIPTION OF THE DRAWINGS

These objects, features and advantages will be more readily understood with reference to the attached figures and following description.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (™) line of computers which run on the AIX (™) operating system.

Figure 1:
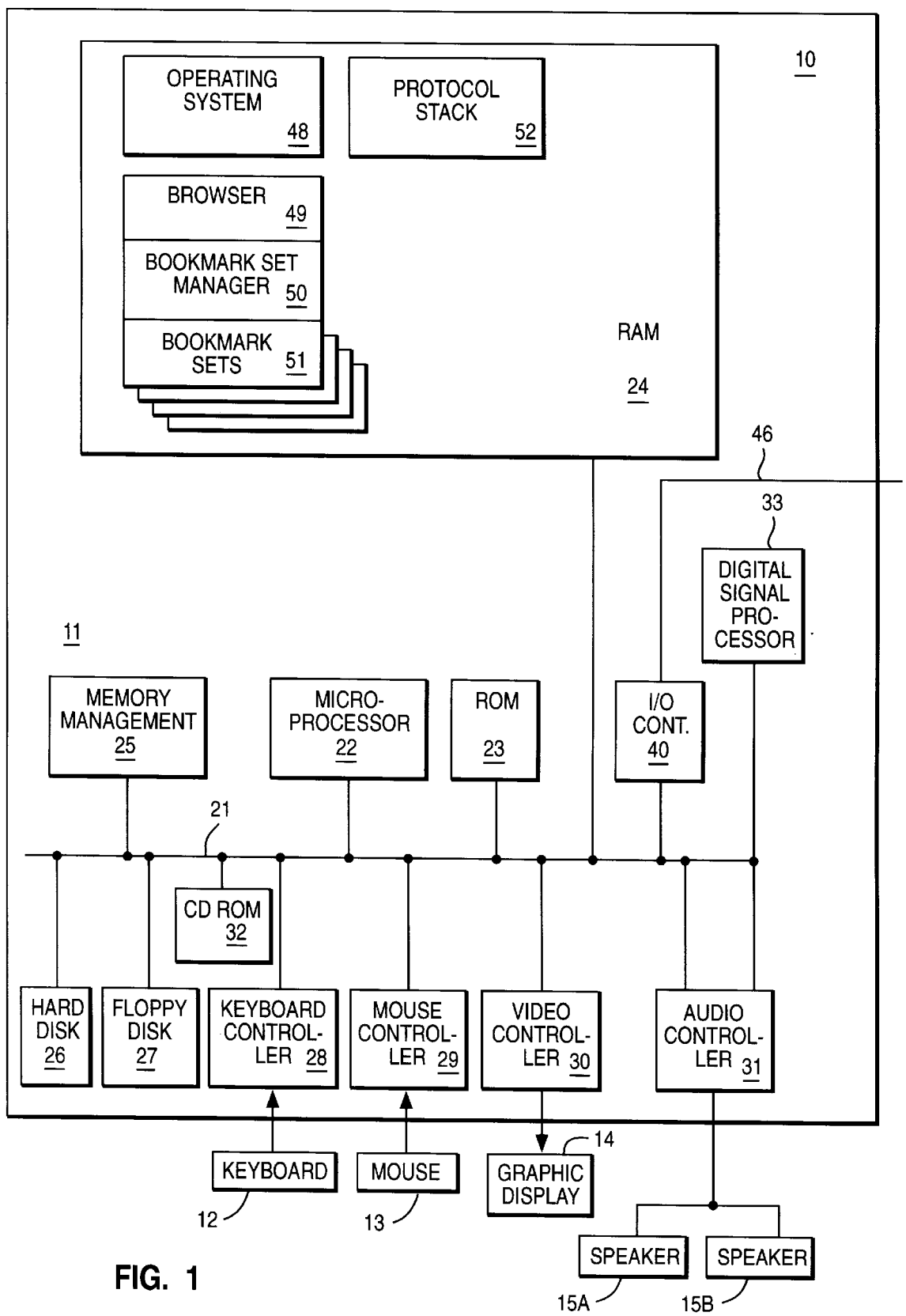
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

A web browser is a program that allows viewing the content of the Internet. A well known web browser is Netscape Navigator, however, many browsers exist. Some are general purpose and have many capabilities to provide a variety of functions. Other are less capable and special purpose. In general, a web browser is a program which is capable of parsing and presenting a document written in HTML, although those skilled in the art would appreciate that other markup languages such as dynamic HTML and XML will be used in the browsers of the future. In the present invention, the browser must also be equipped with a bookmark manager, a software module which handles sets of bookmarks which provide referents, typically URLs, to various locations in the Internet. The bookmark manager is preferably part of the browser itself.

Upon starting a web browser, the first page the user sees is the current "home page". The URL of the home page can be regarded as the first bookmark in the browser. Although entry of a URL is one way of browsing the Web, the user may also traverse to another Web page by clicking highlighted words, images or graphics in a page activating an associated hyperlink to bring another page of related information to the screen. Each hyperlink contains URL location information that serves as an address of the web site. Navigational aids such as Back and Forward toolbar buttons are available to proceed back or forward to pages which have been previously accessed. Other navigation aids are the bookmarks which are used in the present invention.

Figure 2:
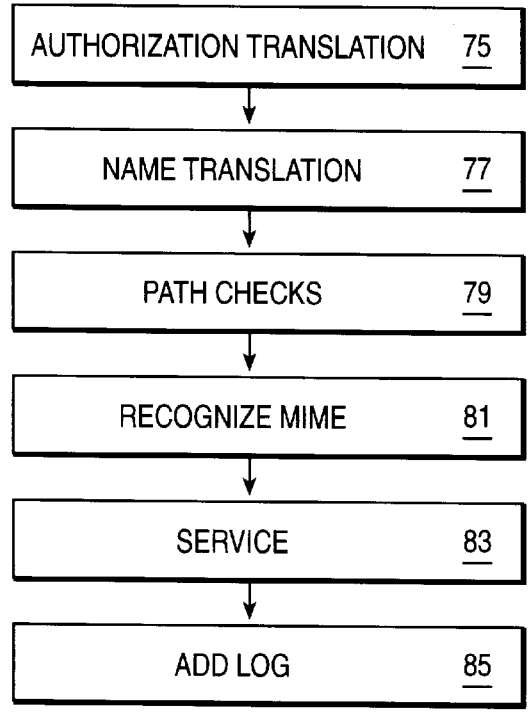
FIG. 2 depicts the processing of an HTTP request in the Internet environment.

In the Internet, the Web server accepts a client request and returns a response back to the client. A series of server computers may be involved in the retrieval of a specific web page. The operation of the server program is governed by a number of server application functions (SAFs), each of which is configured to execute in a certain stop of a sequence. This sequence, illustrated in FIG. 2, begins with the authorization translation step 75 during which the web server translates any authorization information sent by the web client into a user and a group. If necessary, the step 75 may decode a message to get the actual client request. At the name translation step 77, the URL associated with the request may or may not be translated into a system-dependent file name, a redirection URL or a mirror site. In the path checks step 79, the server performs various tests on the resulting path to ensure that the given client may retrieve the document.

In step 81, Multipurpose Internet Mail Extension (MIME) type information, e.g., text/html, image/gif, for the given document is recognized. In the service step 83, the Web server routine selects an internal server function to send the retrieved information back to the requesting web client. This function can run the normal server service routine to return a file or some other server function, such as a program to return to return a custom document or a CGI program. At the Add Log step 85, information about the transaction is recorded.

A URL or "Uniform Resource Locator" is defined in RFC 1945, which is incorporated herein by reference. As is well known, the URL is typically of the format: http://somehost/somedirectory?parameters . . . " where "somehost" is the hostname position of the URL, "somedirectory" is a directory in which the web page may be found. The usual manner in which a URL is resolved into an actual IP address for a web server is through the use of a nameserver. In an internet or intranet network, a nameserver maps hostnames in URLs to actual network addresses. An example of a nameserver is the Domain Name Service (DNS) currently implemented in the Internet. The process of having a Web client request a hostname and address from a nameserver is sometimes called resolution. In TCP/IP, the nameserver resolves the hostname into a list of one or more IP addresses which are returned to the Web client on an HTTP request. Each IP address identifies a server which hosts the requested content made by the browser.

Each bookmark entry is comprised of a URL to a favorite page and an associated descriptive text string which describes the web page in such a way to be easily recognized by the user. The descriptive text can be entered by the user when creating the bookmark set. Also, the typical browser default, when the user does not enter any descriptive text, is to use the text within an embedded "title" tag which is often sent as part of the HTML header. Other information such as pointers to cached copies of the web page can be included in the bookmark entry.

Named Internet Bookmark Sets

Current web browsers process bookmarks as single URL entities within a single repository of bookmarks. Some browsers have the capability to organize the bookmarks by folders; however, even if a particular folder is chosen, all bookmarks remain available for selection without restrictions. While the user can group the bookmarks into several user-specified categories, an entity which operates like the "bookmark set" described by the Applicants is lacking. The inability of prior art browsers to process groups of bookmarks, particularly subgroups of the overall bookmark list, as an entity is disadvantageous.

For example, it is possible to include a list of bookmarks in an electronic message to another user. However, this takes a lot of manual work by one user to make the list and more work by a second user to incorporate the list into the second user's browser's bookmark list. It is not possible to request a downloadable bookmark set which is smoothly integrated in the bookmark file of prior art browsers in a single operation.

As another example, in prior art browsers, bookmarks can not be installed as a set, nor once installed can bookmarks be managed, e.g., stored, selected or deleted, as a bookmark set. When installing bookmark entries, prior art web browsers require the users to install each bookmark individually rather than installating a group of bookmarks as a set. Prior art web browsers do not support the concept of deleting a bookmark set, where all the bookmark entries are deleted as a set. The maintenance of bookmark entries in the prior art web browsers requires manual intervention, handling individual URLs for all bookmark entries.

This invention creates the concept of "bookmark sets" to provide greater capability than exists in the prior art bookmark technology.

A bookmark set is an entity which has attributes of its own, e.g., active vs. inactive, and manages attributes and behavior, e.g., dynamic vs. static, of its individual bookmarks. A bookmark set is a finite collection of bookmarks that have static and dynamic characteristics. An action such as selection, deletion or e-mail transmission can be accomplished for the entire set in a single operation by the user.

Since the bookmark list in prior art web browsers is basically one huge list, they allow unrestricted access to all bookmark entries, regardless of classification. The present invention adds the concept of an "active" bookmark set. Each bookmark set is a collection of bookmark entries that can be made active or inactive as a working set. The active bookmark set comprises the only bookmarks which can be accessed through the bookmark mechanism.

In some embodiments below, the active bookmark set is the only list of web sites, including their subdirectories, that can be visited by use of the browser. In these embodiments, the main "user" is the program developer, the system administrator or parent, who allows less privileged users limited access to the Internet. Those web sites outside the active set require special password permission to access. In these embodiments, a bookmark set is not only a collection of URLs, but precludes an unprivileged user from unlimited browsing or adding more URLs to the bookmark set. This is not possible in current browsers in which the bookmark function can not be configured to limit the bookmark list to a specific URL set.

Bookmark sets allow the user to create specific sets of URLs depending on his or her needs. For example, a privileged user can configure an Office bookmark set, a Home bookmark set and a Daughter bookmark set to satisfy each of the environments and users of the browser. Some or all of the bookmark sets may be password protected to use. In some embodiments, there is an additional password to modify or create a bookmark set. A sample "work" bookmark set is given below:

Work:
    www.HTML.Reference/Definitions"//Descriptors/index.html
    www.Javasoft.Javadefinition.com
    w3.myproject/FVN.results.com
    w3.status report.project office/myproject.status
    w3.server.performance/my project.results
    w3.myproject/resources1/people The text descriptors are the "Title Page" that comes in the HTTP header.

The invention allows the association of a home page with each respective bookmark set. Thus, when the user switches the active bookmark set from his Home bookmark set to his Work bookmark set, his home page switches as well. An alternative embodiment is to have a home page bookmark set. Each successive activation of the home page button of the browser would open a different home page window until all of the configured home pages were retrieved.

As described above, the invention allows the user to create specific and unique bookmark sets for each of the tasks for which he uses the browser. Although the bookmark set could be designated active in many ways, a bookmark set can be activated through a browser configuration option. For example, by a "Select active bookmark set" option in a bookmark pulldown, the user can specify the unique bookmark set that is active at any one session.

For example, on a portable computer which is used both at home and work, a user can have a "work" bookmark set, a "hobbies" bookmark set, a "news" bookmark set, a "kids" bookmark set and a "financial" bookmark set using this invention. The members of the household who use the computer can possess the appropriate passwords to the appropriate bookmark sets. They make their bookmark sets active through the use of the bookmark pulldown.

The user at work can select his "work" bookmark set as his active bookmark set. All other bookmark sets are inactive and can only be activated through the browser preferences menu. For the privileged user, the ability to manage bookmark sets as a collection of bookmarks instead of managing one URL at a time like in the folder paradigm is advantageous. For example, the ability to change an attribute of all the bookmarks, e.g., inactive, active, dynamic, static, or to perform an action such as deletion or password protection for all the bookmarks in the active set is part of the invention. Also, the privileged user may exercise control over the web sites to which non-priviledged users have access.

Figure 3:
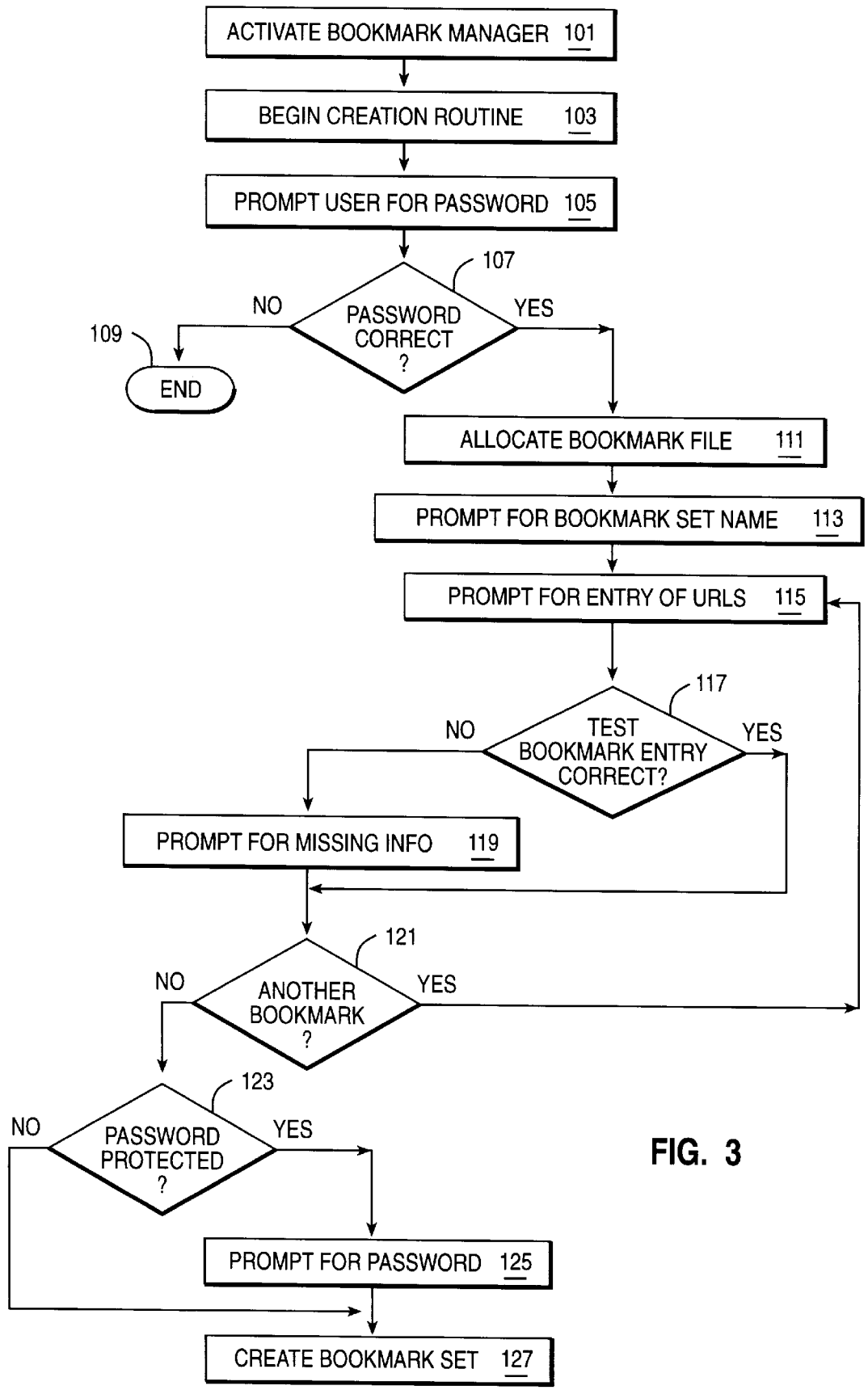
FIG. 3 shows a flow diagram of the creation of a list of bookmarks.

An illustrative method of creating a bookmark set according to the invention is shown in FIG. 3. Those skilled in the art will recognize that other steps in other user interfaces may be used to assemble a bookmark set. In step 101, the bookmark manager is activated in response to user selection of the bookmark item on the browser pulldown menu. In step 103, after the menu item "Create named bookmark sets" is selected through a browser preferences menu in the browser, a creation routine for the bookmark set is initiated. In step 105, the user is prompted for a password. Step 107 tests whether the password was entered successfully. If not entered successfully within the number of attempts allowed by the browser security protocol, the process ends, step 109. At this point, other actions such as browser lockup, disconnect from the network as well as various alarms are possible.

Presuming the user successfully enters a password, in step 111, a new bookmark file is allocated for the new bookmark set. In the preferred embodiment, a bookmark set definition is contained within a single bookmark file. At the time of the creation of the bookmark set, the user is prompted for a name for the set, step 113. Next, the user can specify a URL, i.e. bookmark, that belongs to the set, step 115. A text descriptor for each bookmark is also added in this step. The system tests each bookmark and that a bookmark set name and at least one URL is added to the bookmark set, step 117. If not, the user is prompted that there is not enough information to create a bookmark list, step 119, and given an opportunity to provide the missing information. In step 121, the user is asked whether there is another bookmark to add to the set. If so, the process returns to step 115.

The user is queried whether the bookmark set is to be password protected, in step 123. The user is prompted for the password which becomes part of the bookmark set, step 125. Step 127 represents the creation of the bookmark set and the addition of its name into a menu of selectable bookmark sets. Once created, the users with the appropriate permissions can access the bookmark set.

Figure 4:
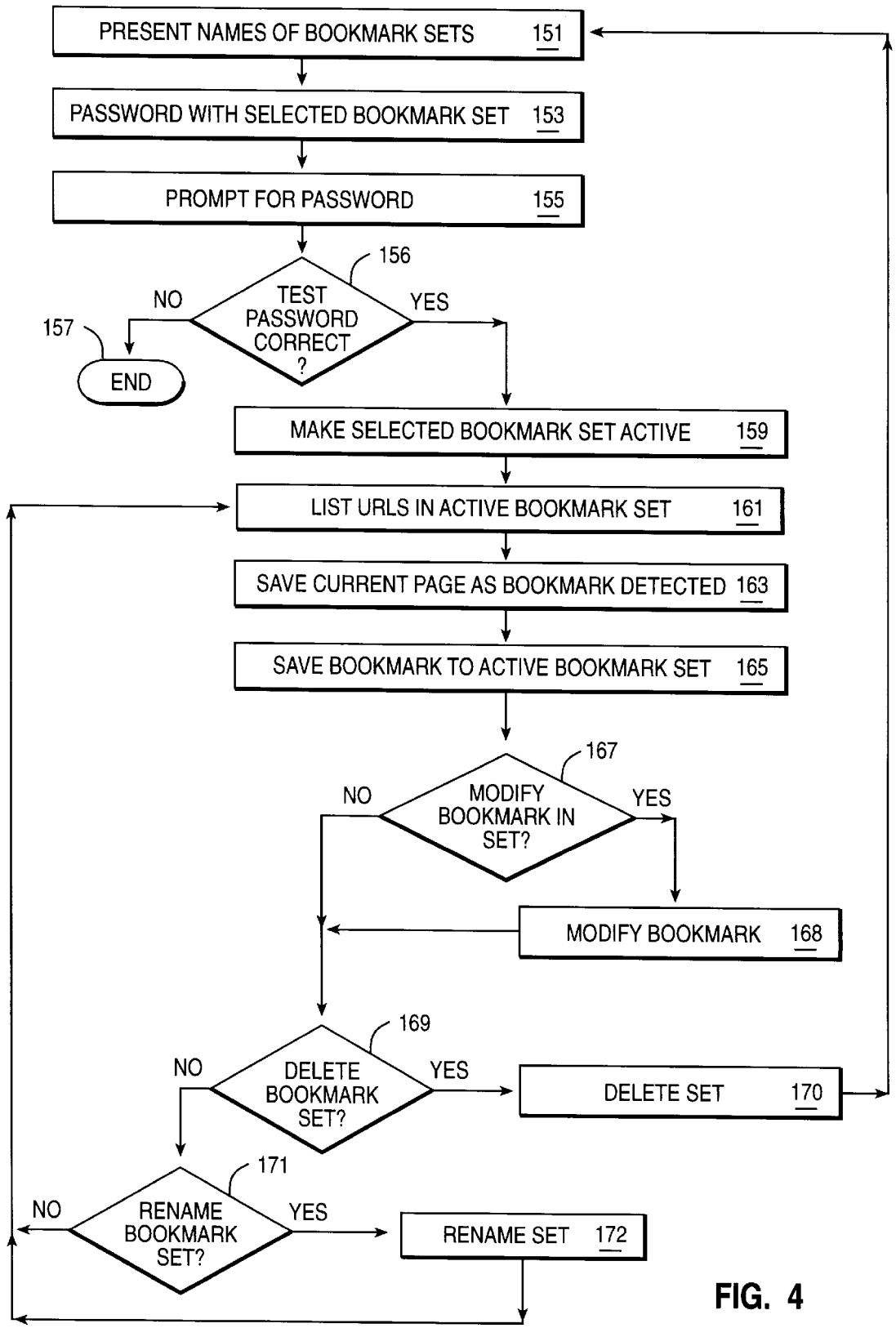
FIG. 4 is a flow diagram of rendering a bookmark set the active set according to the present invention.

The selection of the active bookmark set through the browser preferences menu is shown in FIG. 4. In step 151, the names of the selectable bookmark sets are displayed in tabular form by the browser. Those password protected may be marked by some indicia, e.g., an icon or coloration. In step 153, in response to user selection of a bookmark set to be active, the system retrieves password information for the bookmark set, if any. If there is password protection, the user is prompted for the password, step 155. If it is not correctly entered, step 156, after the allowed number of attempts, the process exits, step 157. Various lockup actions as described above may take place if the user attempts to access a bookmark set for which he lacks the correct password.

If the password is correctly entered, in step 159, the selected bookmark set becomes the active set. In step 161, the browser uses entries in the active bookmark set to list the available bookmark URLs, typically as the text strings which accompany the actual URLs. In step 163, the current page is saved as a bookmark in response to a user action in the interface, e.g., selection of "add to bookmark set" option. The save action for a bookmark for the page saves the bookmark to the active bookmark set. In this way, the bookmark manager can automatically add bookmarks to the active bookmark set without actually requiring the user to type out the URL and text descriptor, step 165. This action of adding URLs to the bookmark set can be protected by a separate password, if desired (not shown). In step 167, a test detects that the user has indicated that he wants to modify a bookmark in the active bookmark set. A password may be required (not shown). If allowed to change the password, the system modifies the password in response to user input, step 168. The bookmark manager also detects whether the user wants to delete the entire bookmark set, step 169. If allowed, the bookmark manager deletes the active set in step 170 and returns to step 151 to present the bookmark set list. The bookmark manager also detects whether the user wants to rename the bookmark set, step 171. If allowed, the active bookmark set is renamed. Only bookmarks in the active set are available for modification, deletion or renaming in the preferred embodiment of the invention.

Other changes such as changing an attribute of the bookmark set or the type of password protection for the bookmark set are not illustrated in the figure. While any alteration of the bookmark set may be password protected by an additional level of security, in one embodiment of the invention, a user who has access to a bookmark set automatically has the right to modify it.

Figure 5:
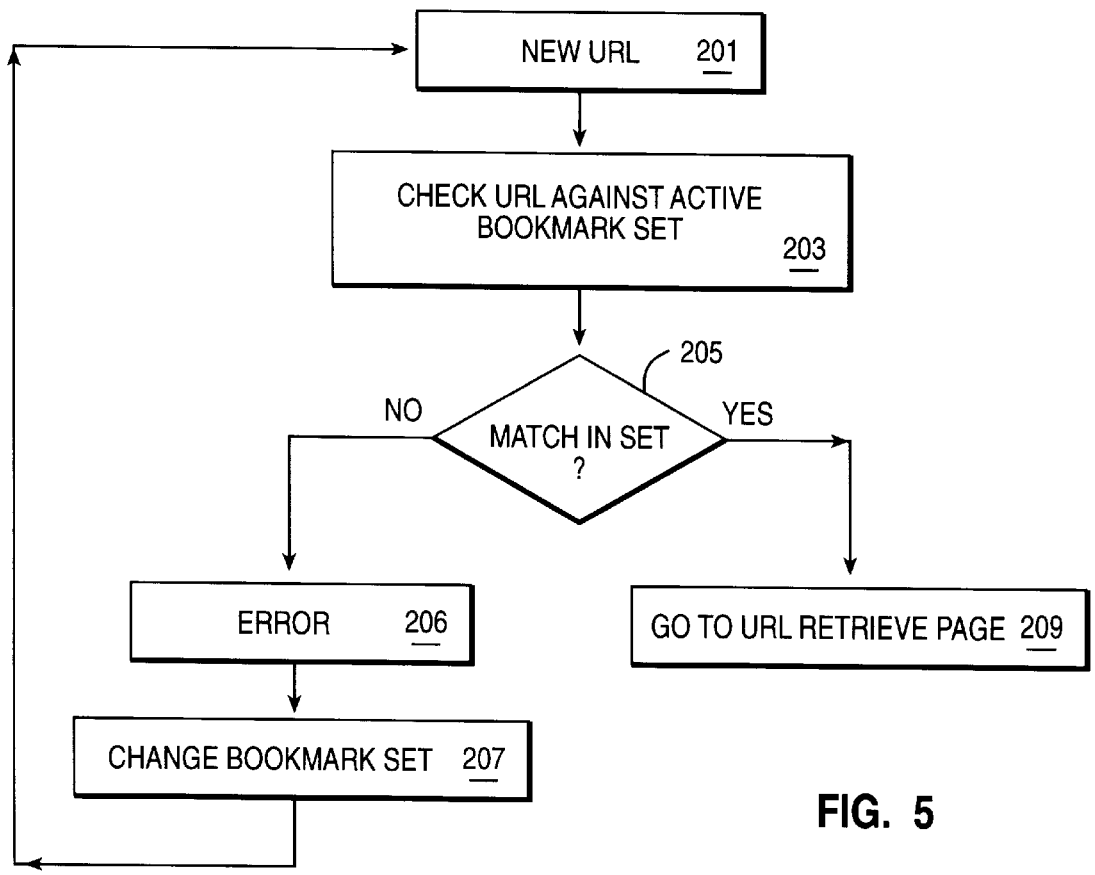
FIG. 5 shows a flow diagram of using the bookmark set architecture of the present invention to limit access to the URLs of the active bookmark set.

The use of active and inactive bookmark sets not only provides a convenient grouping of URLs to organize the browser environment, but in one preferred embodiment, as a method to preclude the user from visiting Web sites not included in the bookmark set. In this embodiment, only when the bookmark set is active can the user access the URLs associated with the bookmark set. (In other embodiments, the restriction only applies to access through the bookmark list pulldown menu, but not through other means.) As shown in FIG. 5, the browser checks whether a URL is in the active bookmark list before allowing the user to browse or retrieve web pages at the site.

In step 201, the user has selected a next URL to browse, either by entry in the URL field of the browser or by activating the hyperlink in a browsed page. The reader should note that in some preferred embodiments of the browser, there is no field in which to enter a URL so that the user is more constrained to the bookmark set. In step 203, the browser checks the selected URL against the list of URLs in the active bookmark set. If a match for the URL is not found, or in a subdirectory of a listed URL, step 205, a panel is shown to the user indicating an error has occurred; e.g., "The requested web site can not be browsed with the current active bookmark set", step 206. A privileged user could change bookmark sets, step 207. In the alternative, a permitted URL can be chosen, back to step 201. Persistent attempts to reach unlisted URLs could result in a browser lockup or an alarm. If the URL is listed, in step 209, the browser retrieves the web page associated with the URL and proceeds normally.

Important implementions of the bookmark set include unique point of sale or other special purpose applications. In one implementation of the bookmark set, a user receives a CD-ROM in the mail or with a magazine. The CD-ROM contains a browser equipped with the bookmark manager and a single active bookmark set. Thus, the browser can only access the URL addresses that the vendor wants to advertise.

Also, the kiosk or point of sale environment is another potential application for bookmark sets. In a kiosk, typically sponsored by a vendor, the browser may only have access to specific addresses. This prevents the user from accessing unrelated URLs, wasting the vendor's resources. The retailer which owns the kiosk can rent out the kiosk to interested vendors. It is an easy matter to switch the active bookmark set with a change of vendors.

Figure 6A:
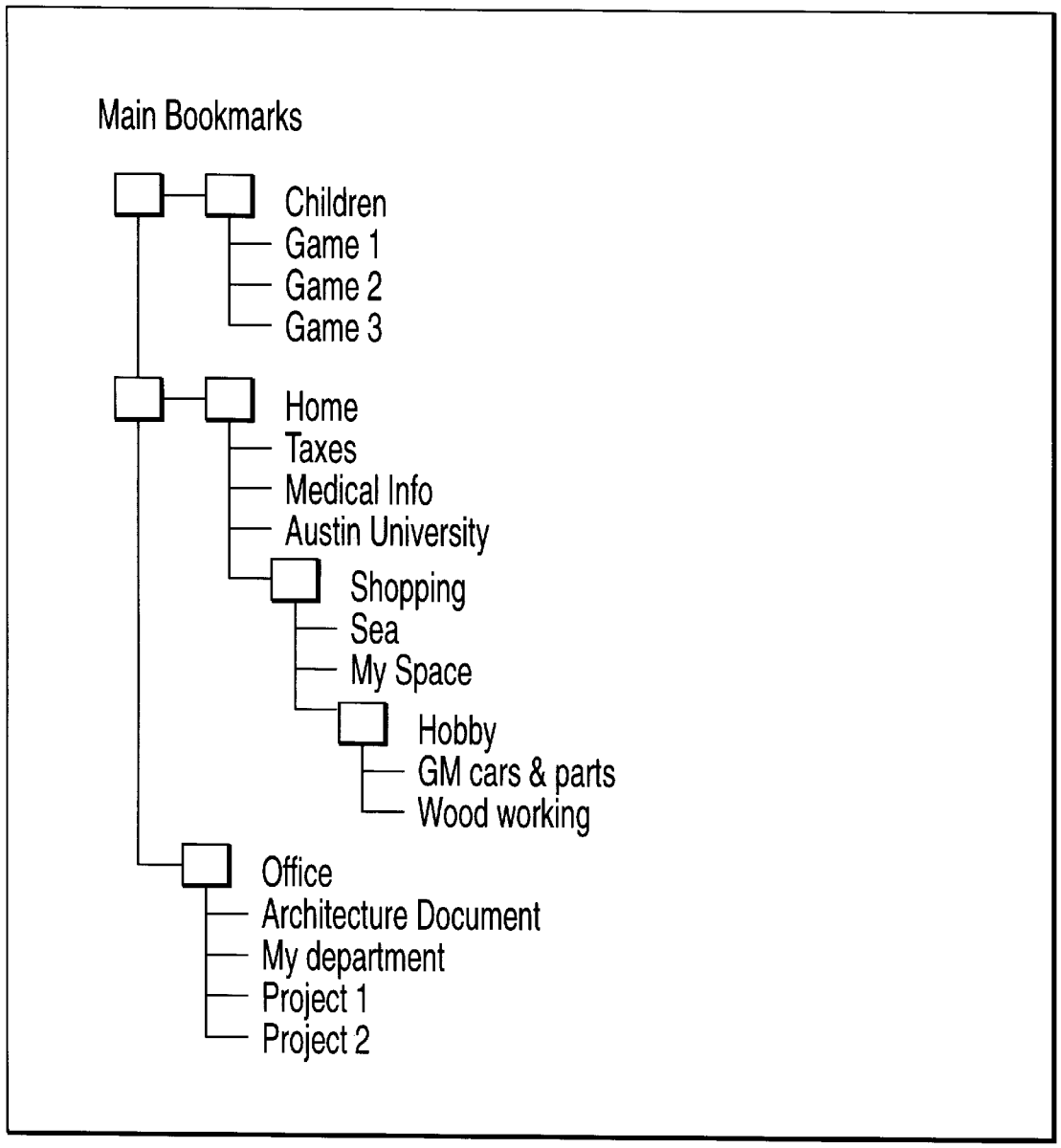
FIGS. 6A and 6B respectively depict user interfaces for prior art browsers and a browser which follows the present bookmark set architecture.
Figure 6B:
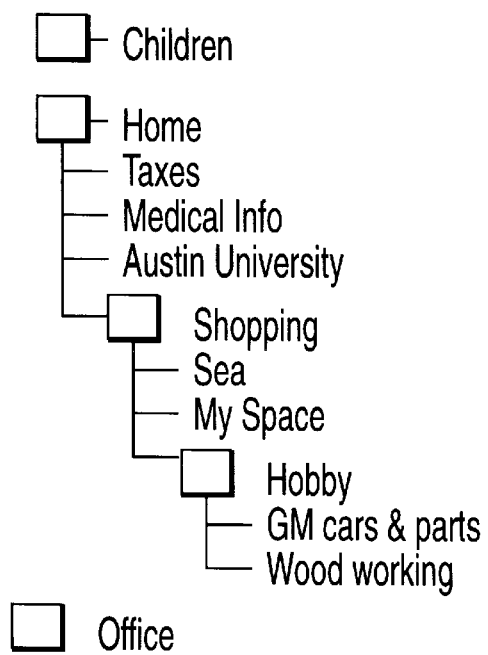

FIGS. 6A and 6B respectively show the user interface of prior art bookmark technology and the user interface of the bookmark technology of the present invention. As shown in FIG. 6A, in the prior art interface, all of the bookmarks 251 stored in the browser are made available to the user for selection. The only possible organization of the bookmark list is by folders or topics.

FIG. 6B shows a user interface of a browser using the bookmark set technology. Notice that the user has only one active bookmark set 261 at a time. In the example, the user has three bookmark sets, Children 263, Home 261 and Office 265, and only the Home bookmark set 261 is available using the bookmarks pulldown menu. Referring to the bookmark set manager, a user will see the current bookmarks associated with the active bookmark set. To modify or access an inactive bookmark set, if he is allowed, the user first makes it the active bookmark set.

Internet Blacklist Bookmark Set

In this embodiment of the invention, a special type of bookmark set, the blacklist bookmark set, is introduced.

As noted above, prior art Web browsers allow unrestricted user access to any URL on the internet. A system administrator or parent that wants to restrict access to specific URLs or to a set of URLs requires an add-on program to the web browser that filters TCP/IP addresses. This method lacks granularity, any desired URL at the same TCP/IP address is restricted as well as the undesired ones. By using the TCP/IP address as the determiner, both the acceptable and as well as the unacceptable URLs become inaccessible to the browser.

There is no control mechanism within the prior art browser itself. As the filtering application is outside the browser, the prior art browser still makes the attempt to connect to a prohibited URL. This arrangement results in unnecessary use of client system resources.

It would be much more useful to restrict access to unique URLs using the browser itself. While the embodiment above provides one means of controlling access to the web to the list of active bookmarks, its control is primarily a positive one. The user has access to all of the URLs reachable from a particular Web site. This is not a fine filtering arrangement.

Thus, the invention adds the blacklist bookmark set to allow a system administrator or any browser user to specify one or more URLs, as a set of URLs for which restricted access is desired. The blacklist bookmark set contains a number of blacklisted URLs to which a web browser user is prohibited from accessing, no matter what bookmark set is active. In effect, the blacklist bookmark set is a second active bookmark set which is always active and qualifies the access granted to the Internet by the other active bookmark set. The use of two bookmark sets can provide a fine filtering mechanism with a minimum of URL entry.

As the reader will recall, some of the embodiments of the active bookmark set above use the active bookmark set only as a filter for bookmark access to URLs. If this is the case, the blacklist bookmark set will be the only filter. In one embodiment of the blacklist bookmark set, it is used alone without an active permissive bookmark set of the embodiment above.

In the preferred embodiment, the blacklist bookmark set is created and modified through the browser preferences menu. The method of creating a blacklist bookmark set is similar to that described in connection with FIG. 3 above. However, at least the removal of blacklisted bookmarks should be password protected. To add a bookmark to the blacklist bookmark set rather than the active bookmark set, the blacklist bookmark option in the browser preferences should be chosen.

The web browser user can access any URL in the current active bookmark set, except those listed in the blacklist bookmark set. In one preferred embodiment, only the system administrator can add, remove or modify blacklist bookmarks through the browser preferences menu. However, in an alternative embodiment, the user can add the blacklist bookmarks, but can not delete or modify blacklisted URLs. In the alternative embodiment, the web browser administrator is the only person allowed to remove or modify blacklisted URLs from the blacklist bookmark set.

In the preferred embodiment, the web browser user is not allowed even to view the blacklist bookmark set. However, this is optional. In this preferred embodiment, the system administrator is the only one capable of viewing the blacklist bookmark set and this action is protected via password.

The web browser user can not add an explicitly blacklisted URL to his regular bookmark set. The bookmark manager will detect this act and notify the user that it is not permitted. However, since some URLs at the same site may be acceptable, the user can add URLs which are related to the blacklisted URL. When the user attempts to traverse to the blacklisted URL, e.g., by hyperlink, the bookmark set manager will detect that the destination URL matches one in the blacklist and disallow the action. If the system administrator updates the blacklist bookmarks set such that one of the entries matches an entry in one of the user's bookmark sets, preferably the matching entry will be removed from the user's bookmark set. In any event, the user will be precluded from visiting the old bookmarked site.

The blacklist bookmark set is a more effective and efficient means of preventing access to blacklisted URLs than the helper applications of the prior art. Since the blacklist bookmark set is an integral part of the browser, processor time is not wasted making HTTP requests to disallowed URLs. Since the blacklist is on a URL basis rather than on a TCP/IP address basis, finer granularity is achieved. Since the blacklist bookmark set is an entity, it can be easily installed as a unit in many browsers connected to the network. Thus, tedious entry of bookmarks is avoided. If the blacklist bookmark set is updated by the administrator, the new set can be similarly distributed to the users. Of course, it is possible to distribute one blacklist bookmark set to one set of users and another blacklist bookmark set to a second set of users. In the blacklist bookmark set, password attributes can be attached to the individual manipulation actions for the blacklist bookmark set. Thus, when it is downloaded to the user, the bookmark set manager at the browser can maintain the policies desired by the administrator.

Figure 7:
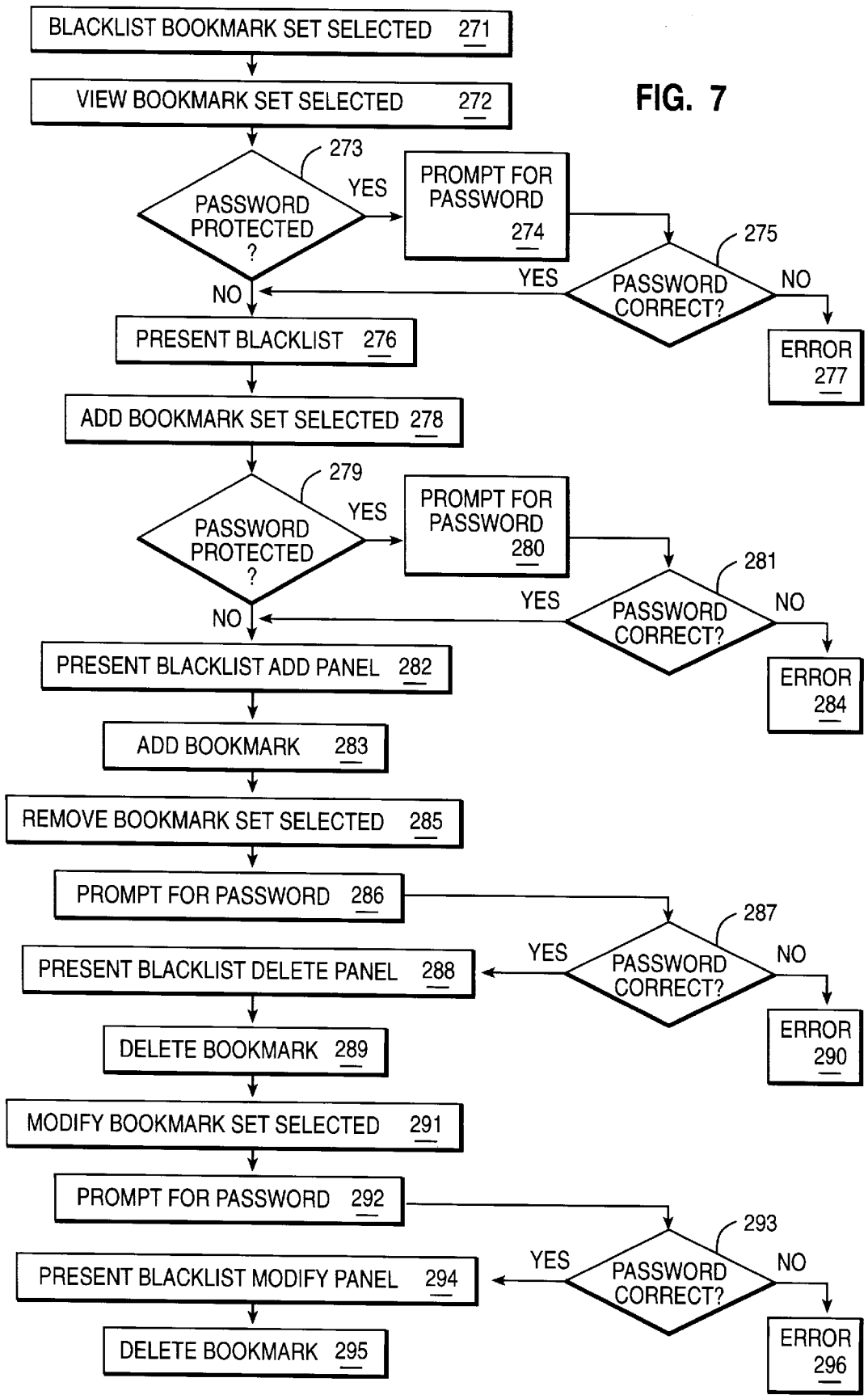
FIG. 7 illustrates the use of a blacklist bookmark set to control the URLs visited by the browser.

The manipulation of the blacklist bookmark set is shown in FIG. 7. In step 271, the blacklist bookmark set is selected in the browser preference menu. In step 272, the browser has detected that the user has selected the view bookmark set option. In step 273, the bookmark set manager ascertains whether this action is password protected. If so, step 274 prompts for the password. In step 275, a test determines whether the password was entered correctly. If not password protected, or the password is authentic, the blacklist bookmark set is presented, step 276. Otherwise, in step 277, an error panel is shown to the user.

In step 278, the browser has detected user selection of the add bookmark option. In step 279, the bookmark set manager determines whether this action is password protected. If so, step 280 prompts for the password. In step 281, a test determines whether the password was entered correctly. If not password protected, or the password is entered correctly, a panel to add the bookmark to the blacklist bookmark set is presented in step 282. The bookmark is added in step 283. Otherwise, in step 284, an error panel is presented to the user.

In step 285, the browser has detected user selection of the remove bookmark menu item. In the preferred embodiment, this action is password protected. Step 286 presents a panel for the password. In step 287, the bookmark set manager determines whether the password was entered correctly. If the password is correct, a prompt to select a bookmark to the blacklist bookmark set is presented in step 288. The bookmark is deleted in step 289. In step 290, an error panel is presented to the user who enters the password incorrectly.

In step 291, the browser has recognized user selection of the modify bookmark option. In the preferred embodiment, this action is password protected. Step 292 prompts for the password. In step 293, the bookmark set manager decides whether the password was entered correctly. If the password is entered correctly, a prompt to select a bookmark to the blacklist bookmark set is presented in step 294. The bookmark is modified in step 295 according to user input. In step 296, an error panel is shown to the user who enters the password incorrectly.

Figure 8:
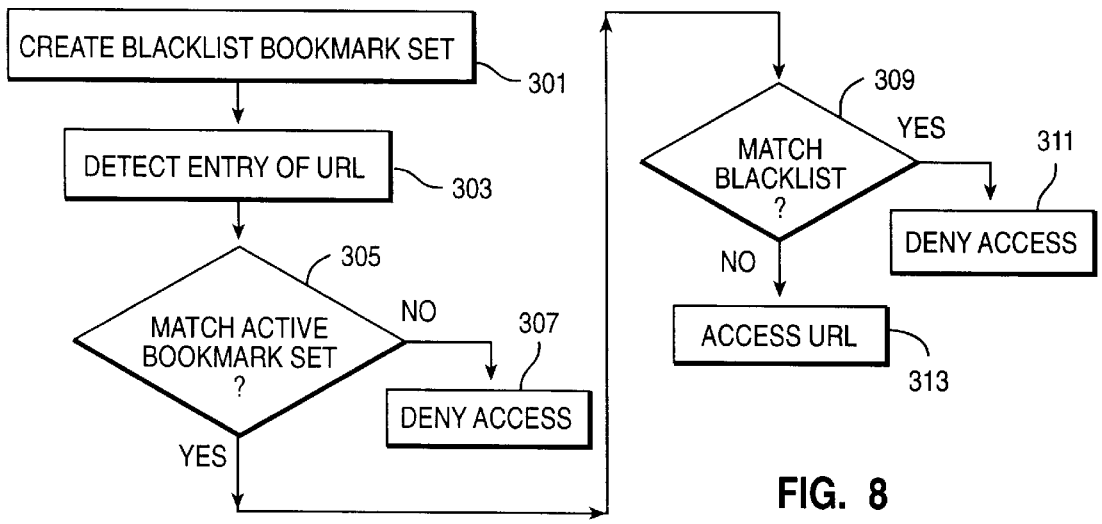
FIG. 8 is a flowchart of the blacklist bookmark set embodiment.

FIG. 8 shows a flowchart of the blacklist bookmark set process. In step 301, the blacklist bookmark set is created, retrieved from the server or otherwise provided to the local browser and added to the resident bookmark sets. In step 303, the browser detects the entry of a destination URL either through hyperlink or through manual entry. In step 305, the browser detects whether it matches an entry in the active bookmark set. If not, the browser denies the user access, step 307, and does not fetch the URL. If so, in step 309, the browser tests whether the URL matches a blacklisted URL in the blacklist bookmark set. If so, in step 311, the browser denies the user's request and does not retrieve the web page. If not, in step 313, the browser accesses the web site as normal.

The blacklist bookmark set is useful in a variety of applications. A point of sale kiosk can be equipped with a browser with a blacklist bookmark set. Many smaller companies do not wish to assume the maintenance costs or technical skills associated with maintaining a web page on a web server. These companies will hire an Internet specialist company to provide the web server and skilled technicians. Many companies may be on the same server at the same IP address. A company who rents the kiosk from the retailer may not wish the users to access other pages at the same TCP/IP address. The helper applications of the prior art could not achieve this granularity.

A corporate intranet is another application of the present invention. A network administrator can quickly install and maintain updated versions of a blacklist bookmark set to assure appropriate use of company resources. By placing the control in the browser itself, additional expenditures for an add on application at each client system is unnecessary. Stopping inappropriate requests at a proxy server is also possible, however, the invention eliminates network traffic associated with the disallowed requests and server responses to those requests.

Although the preferred embodiment of the invention uses the blacklist bookmark set in conjunction with an active bookmark set, selected active from a number of bookmark sets as described above, it is possible that the blacklist bookmark set can be used alone. That is, the blacklist bookmark set can be used in a browser that does not otherwise understand the notion of bookmark sets.

While individual entry of bookmarks can result in a blacklist bookmark set with many entries, it depends how granular and restrictive the administrator or parent wishes to be. Furthermore, wild carding of blacklisted URLs using the server name and subdirectory can avoid manual entry of many bookmarks. For example, where "*" is a wild card in the bookmark syntax, a blacklist entry of www.yahoo.com/((example please))/* will prevent access to any web pages in that directory but allow the user to access the many appropriate web pages available at the yahoo site.

Web Browser Download of Bookmark Set

As the number of web sites has increased dramatically in the past couple of years, so has the number of bookmarks that a typical web browser user maintains on his browser. It is not uncommon now to include hundreds of bookmarks in a bookmark file just after a few weeks of web browsing. The most common way of adding bookmarks to the bookmark file in the prior art browser is to visit a web site, then select that site as a bookmark entry and, if desired, categorize it manually. However, these bookmarks still need to be entered one at a time. The prior art technology used in browsers to update bookmarks is very slow and inefficient. Thus, the creation and maintenance of bookmarks has become a chore for the user.

As can be seen above, the introduction of the notion of the bookmark set entity can provide a number of features unavailable in prior art browsers. The bookmark set also facilitates the creation, installation and maintenance of bookmarks by downloading them in bookmark sets from desired web servers. The web server could be a server associated with a company intranet or other corporate server. Such a server might simultaneously update a plurality of bookmark sets at a plurality of client stations. Alternatively, the web server might be associated with a public web site accessible to any number of users. The download process for bookmark sets can be a pull or a push type operation. From a user interface standpoint, it is a single step process to update bookmarks in an easy, automatic and painless way.

As is discussed below, web sites can provide a user friendly method to add multiple URL addresses to a browser as a bookmark set via a single selection. Web masters can create a site bookmark set for clients interested in the site URLs. In one preferred embodiment, the web master can use special tags or MIME types to identify the nature of the file to be transferred. The bookmark set manager in the browser uses these tags or MIME types to add the bookmark set to the browser's collection of bookmarks.

The user can request a bookmark set by selecting a bookmark set link in the site pages. Alternatively, the user can request the browser for the bookmark set by actuating a button in the browser user interface. The bookmark set request will trigger a download request to the server from the client machine. The browser at the client receives this bookmark set and stores the URLs in its bookmark sets. In one preferred embodiment, the bookmark manager makes the new set the active bookmark set and thus rendering them available for browser use immediately.

For example, this invention will allow a user browsing the IBM home page to download the IBM bookmark set containing URL references to Aptiva personal computers, ThinkPad portable computers, Server computers, Software and so forth.

In one preferred embodiment, the web site server can also automatically notify the user if the bookmark set has been updated and suggest that the user get a new copy of the bookmark set for the site. The user can have a option to subscribe to the bookmark set for updates. In this way, the downloaded bookmark set becomes dynamic in nature. Dynamic update of individual bookmarks within a bookmark set is discussed in greater detail below.

Figure 9:
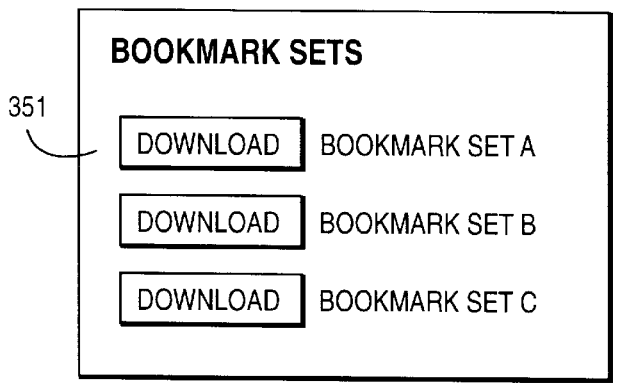
FIG. 9 show a user interface for downloading a bookmark set.
Figure 9:
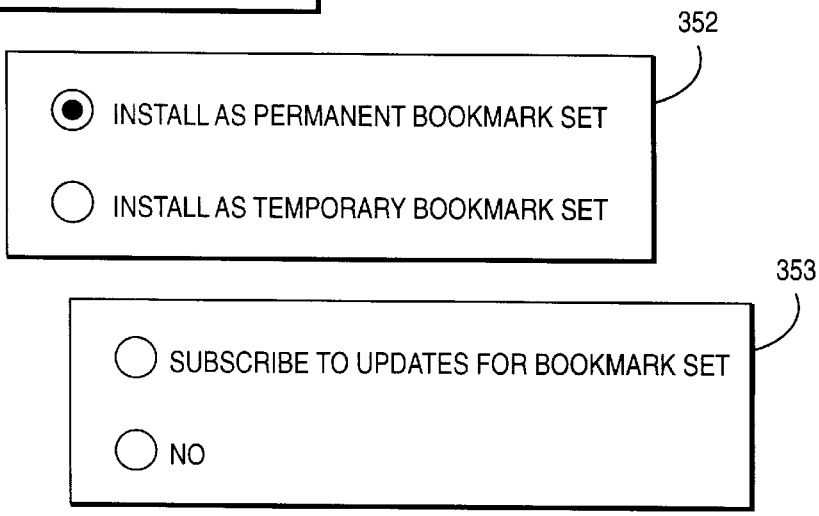

A first embodiment of the invention is a pull operation initiated by the user at a client web browser as shown in FIG. 9. This figure shows a user interface of a web site with a button 351 for requesting a site bookmark list be downloaded to the client. Several such buttons could be present. For example, on an "index" web site, e.g., www.yahoo.collection.com, which makes an effort to provide comprehensive lists of related web sites, a plurality of buttons are possible, each for a different bookmark set. Once activated, a dialog box 352 is presented, asking the user if it is to be a temporary or permanent bookmark set. If a permanent bookmark set is chosen, another dialog box 353 is presented, asking the user if he wants to subscribe to the bookmark list for updates. The dialog box setting the bookmark set attribute is presented by the bookmark set manager in the browser. The subscription option is presented preferrably by the web page.

Figure 10:
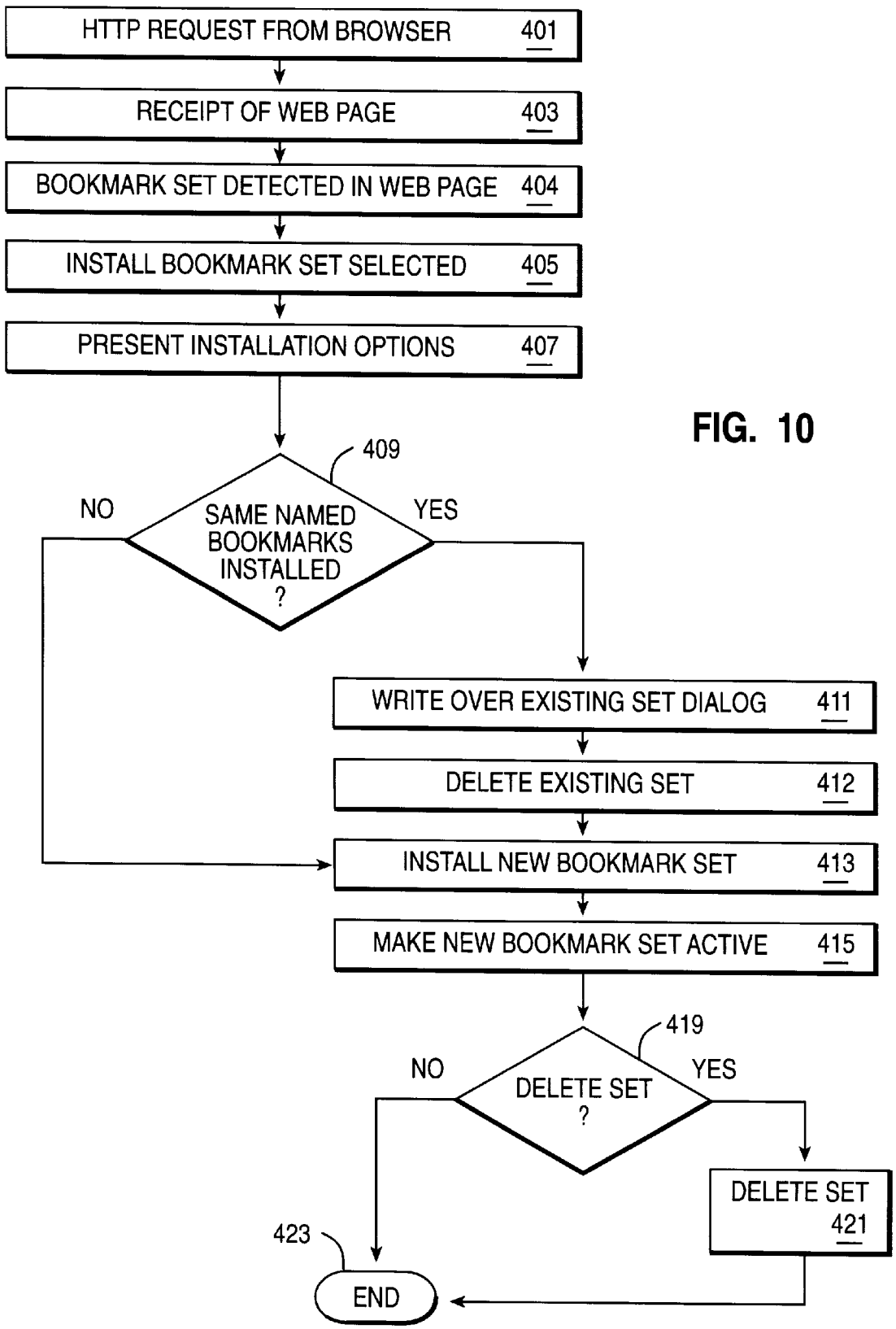
FIG. 10 is a flow diagram showing a pull process for network components in a bookmark set download.

FIG. 10 is a flow diagram showing the pull process between network components in a bookmark set download. The process begins in step 401 with an HTTP request from the browser to a web server with a bookmark set. In step 403, the browser has retrieved a home page for a web site which specifies a set of URLs that can be downloaded to a web browser as a unit, a bookmark set. Within the home page, there is an HTML tag that, when parsed and/or otherwise detected by the browser, step 404, lists the available bookmark sets that can be incorporated in the browser. Through the user interface, the user may select to install one or more bookmark sets made available by the site. The bookmark set could alternatively be incorporated in an HTML file other than a web page. In any case, the bookmark sets will generally point to web references pertaining a subject related to the theme of the visited site.

In the HTML tag, the bookmark set is specified through a unique MIME type, e.g., x-bookmark-set, that if selected by the user gets added to the browser's bookmark options. For example, the HTML for adding a bookmark set for a computer manufacturer would look like:

Content_type: text/Bookmark set<line feed> <line feed> <HTML> <HEAD> <TITLE> GM Bookmark sets</TITLE> </HEAD> . . . </HTML>

In step 405, the browser has detected user input indicating that the user wants to install a downloaded bookmark set. The user input could be activation of a button or other selection means presented in the web page. Alternatively, the browser preferences in the bookmark manager could be set to download the bookmark set, either as a default action to occur whenever a page with a bookmark set is encountered or because the bookmark set was previously downloaded. In step 407, the browser presents the user with two options to install the downloaded bookmark set: Install as a temporary bookmark set; or Install as a permanent bookmark set. A temporary bookmark set only lasts for the current browsing session. A permanent bookmark set become a permanent part of the browser until deleted. In one preferred embodiment, permanent bookmark sets are dynamically updated. One skilled in the art would appreciate that other options are possible.

In step 409, the browser checks to see if a similarly named bookmark set is already stored. If so, in step 411, the action to download a bookmark set with the same name as an already installed bookmark set will cause the browser to pop up a dialog box requesting permission to write over the old set. If permission is granted, the old bookmark set is deleted in step 412 and the newly downloaded bookmark set is installed in step 413. It is made the active set in step 415 so that it can be immediately used.

When the user indicates that he no longer wants the bookmark set, e.g., by input to the user interface, step 419, the bookmark manager will simply delete the bookmark entries with the bookmark set, step 421. From the user perspective, all the bookmark entries contained in the set are deleted in a single operation. In the case of a temporary bookmark set, no user action is necessarily required. Setting the attributes of a bookmark set as temporary can be done by the user when it is downloaded or it may already have temporary attributes from the web server itself.

The concept of downloading bookmark sets relies on a web designer creating one or more bookmark sets for the site they are designing. Today, some Web sites use the concept of "site maps" to get visitors familiar with the site. However, since every Web site has a different HTML style and uses different tools, e.g., dynamic HTML, Java, JavaScript, Lotus Notes Scripting, ActiveX, every site map is a dramatically different experience to the user. The concept of downloading bookmark sets allow the Web site managers to have a common way to provide the users with the most important site links. As discussed above, the preferred embodiment uses special tags in the file or a special extension that could be identified by the usage of MIME types as a convenient way to identify a bookmark set. However, the download mechanism to move the bookmark set document from the web site to the client's machine can utilize any known communication protocol.

In the preferred embodiment, the browser participates in the operation of downloading bookmark sets by parsing for the built in MIME types indicating the bookmark sets extensions, e.g., .bm, .bms, etc. This can be accomplished by changing the browser itself or adding a plug-in to the browser. In either case, the bookmark set is made available immediately to the user upon entry to a bookmarked site.

As another application of the invention, not only can a bookmark set be downloaded, it can be preloaded as well. A PC manufacturer can create a "PC Support" bookmark set for a new machine, so that the new user can easily access that manufacturer's site and related locations such as "Register your PC", "Problem Solutions" and "Order Accessories" entries in the bookmark set. That bookmark set could be named "Acme Computer" and is provided the first time the user visits the Acme Computer site. The bookmark set could be updated with as necessary with each visit to the site.

Figure 11:
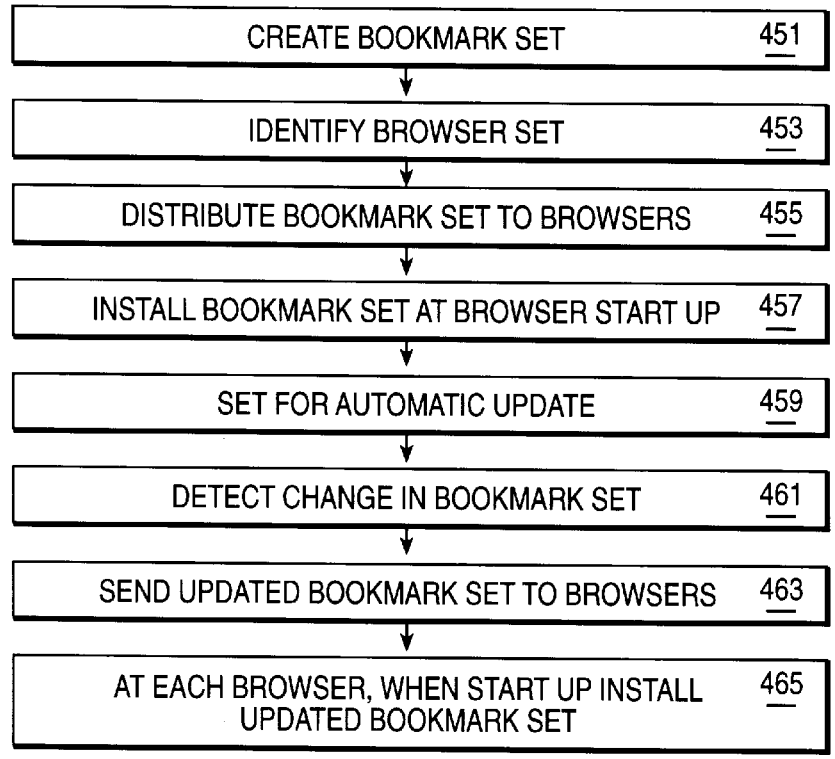
FIG. 11 is a flow diagram showing a push process for a bookmark set download initiated at the browser.

FIG. 11 is a flow diagram showing a push process originated at a web server for a plurality of client browsers. In step 451, a bookmark set is created at the server as is described above. In step 453, a set of browsers and their IP addresses are identified which are to receive the bookmark set. Depending on the desires of the system administrator, the bookmark download could be a one time operation or a recurring operation each time the named bookmark set is updated.

Next, in step 455, the bookmark set is distributed through the network to the specified set of browsers. In step 457, the distributed bookmark set is installed in the browser. At this point, the installed bookmark set is now available for use in the specified browsers as discussed above.

Contemporaneously with the bookmark set installation, the user is queried whether he wants automatic update of the bookmark set when changes occur at the web site, i.e. does he want to subscribe. If so, in step 459, the browser is listed for automatic update of the bookmark set at the web site. In step 461, a change in the bookmark set is detected at the web server. The server refers to a list of subscribing browsers and sends the updated bookmark set to the subscribing browsers, step 463. The bookmark set is automatically installed in running browsers. In other browsers, at the next startup, the browser checks for updated bookmark sets and installs any such bookmark sets. step 465. The Bookmark sets are stored in the Server before downloading.

The server push embodiment is useful for a number of applications. In a company intranet, it is a useful means for the system administrator to install an active bookmark set or a blacklist bookmark set. Setting the operation as an automatic one means that updates to these bookmark sets are seamlessly distributed to the browsers in the network. It is useful for vendor running kiosks at remote locations. The bookmark sets can be updated automatically as the vendor's web sites change. Alternatively, a new vendor's bookmarks can be installed by the retail chain that owns the kiosks. Since the operation can be performed remotely, on a set of machines, or on a single machine, remote administration of the browser in the kiosk is possible.

Another application of the present invention is in an environment of network computers. The client images held at the server can be updated so that the next time the network computer is started, a new set of bookmarks is downloaded.

Web Browser Support for Dynamic Update of Bookmarks

As discussed above, the usefulness of bookmarks has also become their bane. As the number of bookmark entries in a web browser increases, the maintenance task becomes a burden and a manual chore detracting from the Web interaction experience. The download process described in the above embodiment of the invention ameliorates the burden by using the bookmark set as a means of installing and maintaining a set of bookmarks in a single operation. However, despite the advantages of the invention, it is expected that many sites will not automatically download bookmark sets.

Furthermore, a user's bookmark set may contain URLs for a variety of sites. These sites due to their respective popularity or load balancing characteristics behave differently from other sites in the bookmark set. Since these user selected bookmark sets are apt to contain bookmarks from different vendors, it is not possible to dynamically download the bookmark set as an entity.

It would be advantageous to provide an automated mechanism to update a bookmark entry that has become stale due to a change in the name of the site or a change in the URL due to redirection. A web site that changes location normally redirects to the new location, but a bookmark entry in the user's browser still points to the old address. In this way, many bookmarks subsequently become invalid entries in time.

Yet to update the bookmark, the prior art browser technology requires the user to manually add this new address and remove the old bookmark. This is a tedious process and can be confusing to those not familiar with URL addressing. Even those comfortable with the technology itself are often frustrated by the length of many URLs.

This invention addresses this problem by providing a method for a web site to update the client's bookmarks automatically if the bookmark is part of a bookmark set and has "dynamic" attributes. This invention minimizes the length of time necessary to keep an old address and makes the transition to a new URL address transparent to the user.

The invention introduces the concept of bookmark sets, however, in an alternative embodiment, a dynamic bookmark does not have to be part of a bookmark set. The bookmark manager must have the ability to recognize a dynamic versus static attribute of a bookmark. This is not available in prior art browsers.

The method practiced by this invention allows a web browser to retrieve and store bookmarks by qualifying them as one of two different attributes: dynamic or static. Static bookmarks never change unless they are manually updated or deleted. Dynamic bookmarks, on the other hand, are updated dynamically when the page is referenced. While the reader might be tempted to choose a dynamic attribute for all bookmarks, this is not always a good choice. Everytime the user goes to a popular URL such as Yahoo.com, it is not desirable to install the new unsolicited URLs which have been added to Yahoo.

One special type of dynamic bookmark is the temporary dynamic bookmark which is discussed in the section above as an integral part of the temporary dynamic bookmark set. Temporary dynamic bookmarks are added and removed during a visit to a web site. For example, a user just arrived to a www.travel_with_me.com site may have an additional bookmark set for the site added to his bookmark sets. Some of these bookmarks can include important URLs within that site or other related sites. However, as soon as the user leaves the www.travel_with_me.com site, the "temporary" bookmarks disappear from the bookmark set. This "temporary" set of bookmarks is one embodiment of the dynamic bookmarks in this invention. Generally, however, the dynamic attributes of bookmarks are designated individually by the user.

In the preferred embodiment, at the time of the creation of the bookmark, the user identifies the bookmark as a dynamic or a static bookmark. If no selection is made, a default attribute as a static bookmark is stored. By selecting a dynamic bookmark, the user assures that this bookmark in his bookmark set is kept current. If the address or name of the bookmark has changed, the content of the bookmark is automatically updated.

For example, suppose that a user selected a bookmark for support for the OS/2 Warp operating system. Initially, the URL referenced by this bookmark is supported by a server in Boca Raton, Fla. Subsequently, the support page is relocated to a server in Austin, Tex. If a user of a typical browser made a call using the stored bookmark for the Boca Raton site, he would automatically be rerouted by the server network, or less desirably, receive notification that the URL was no longer valid. If the user used a dynamic bookmark of the present invention, when the Boca Raton OS/2 product support bookmark is selected, not only is the browser automatically routed to the Austin OS/2 support group address, but also the browser's bookmark is updated. In the future, the browser will use the Austin server URL. Thus, the invention will reduce the overall load on the Internet, speed the connection time for the browser and avoid dead bookmarks.

A web browser can detect a change in either a site's title or URL location due to redirection. If either condition exists, the bookmark entries, e.g., in the active bookmark set, are searched for a match with the current web site. If the entry is not found in the bookmark set, processing continues as usual.

If a match in either the title or the URL is made between the bookmark entry and the visited site, the bookmark entry is automatically updated, by either updating the bookmark description or the referencing URL. Updating the date information helps determine the need for further update.

In one embodiment of the invention, the web browser preferences menu is modified to contain a "Bookmark Update" selection attribute to enable or disable the automatic update of bookmark entries. The user can configure the browser to prevent the automatic update of dynamic bookmarks or bookmark sets, e.g., the loading of temporary dynamic bookmark sets. This way the user will have all static bookmarks, even if dynamic attributes may have been set by a web master.

Figure 12:
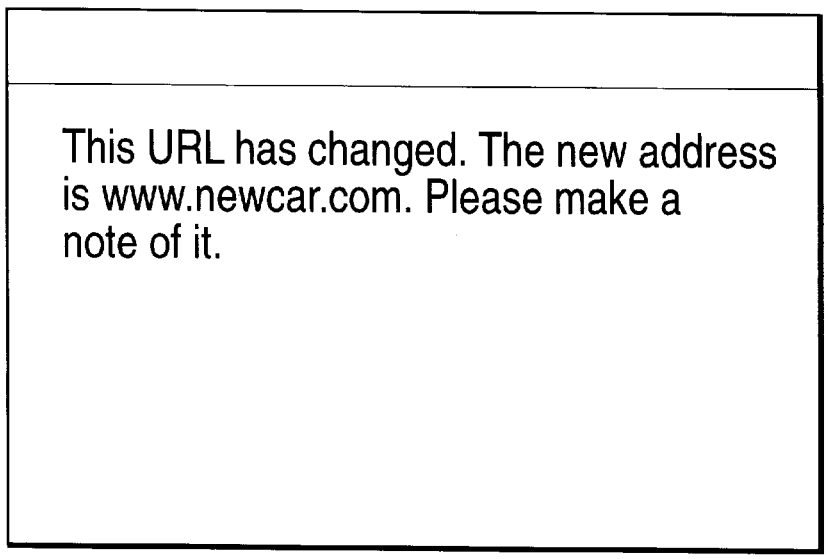
FIG. 12 shows the user interface of a browser when the web site of URLs change.

FIG. 12 shows a typical information message informing the user of changes in Web site URLs. In the prior art, the user is required to manually change the bookmark according to the message. In the preferred embodiment, this invention makes this process transparent to the user. In alternative embodiments, a message from the browser is presented to the user that the bookmark has been updated.

Figure 13:
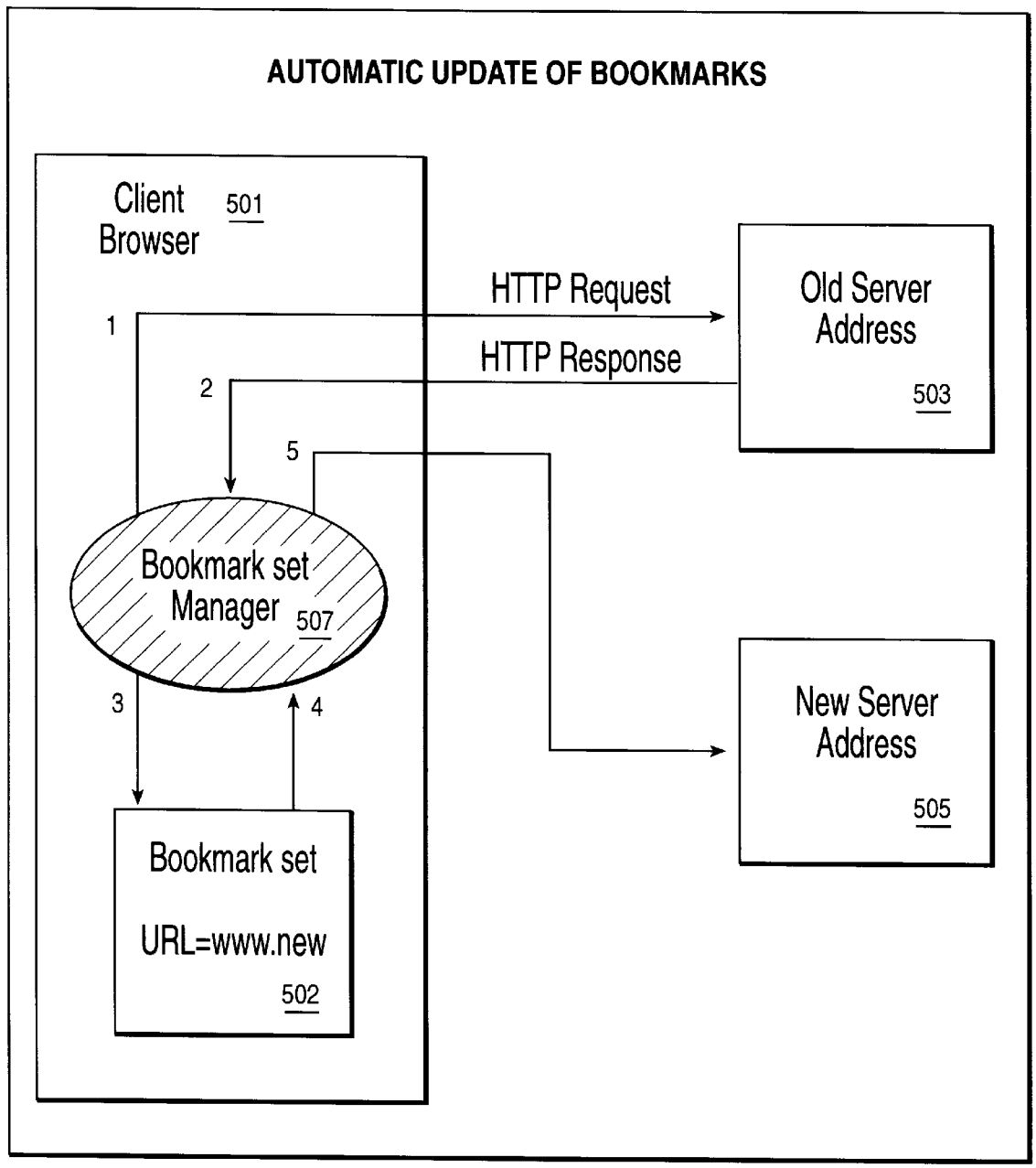
FIG. 13 is a diagram showing the interaction of network components in an bookmark set update.

FIG. 13 shows the architectural relation between the components involved in an automatic update of a bookmark in a bookmark set. First, the client 501 sends an HTTP request to old Web address listed in its bookmark set 502. The server 503 at the old web address receives the request and responds with an HTTP header and messages containing the new URL for the Web server 505 which now supports the Web page. The bookmark manager 507 at the client 501 handles the response. The bookmark manager 507 automatically updates the bookmark in the bookmark set 502 by identifying the old bookmark and updating the bookmark with the new URL information. The bookmark manager 507 sends through the web browser a new HTTP request to the new server 505 using the new URL address.

Figure 14:
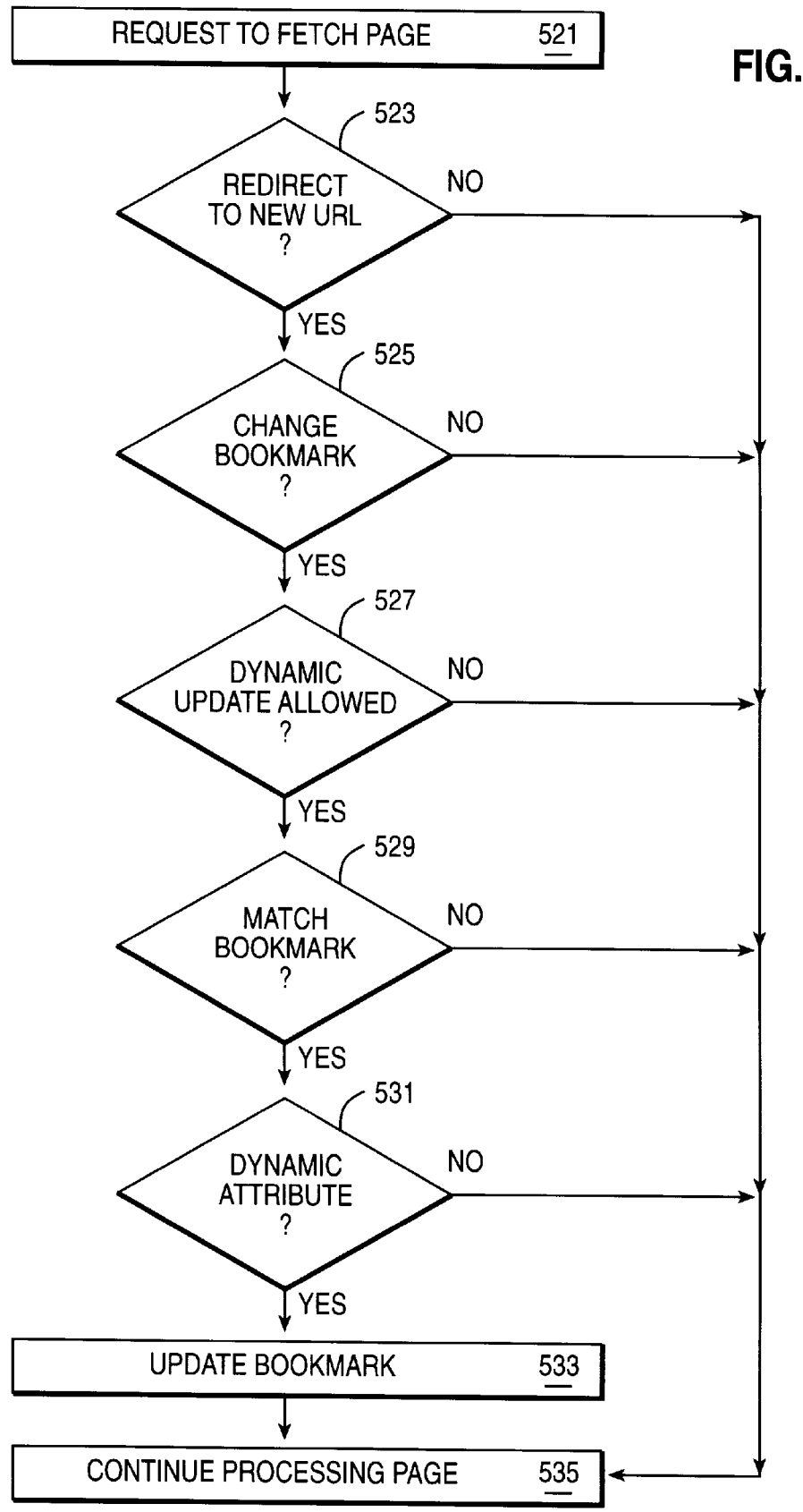
FIG. 14 is a flowchart depicting a process for dynamic update of bookmarks.

FIG. 14 is a flowchart depicting a process for dynamic update of bookmarks. In step 521, an HTTP request to fetch a Web page in HTML from a URL. Step 523 tests whether the HTTP request is redirected to another URL. If so, step 525 tests whether there is enough information to update a bookmark. The test in step 525 also determines whether the redirection is of a type which indicates that the bookmark should be updated. For example, many popular sites use many servers to service requests for a given web page. If a redirection of this type is detected, the bookmark should not be updated since support still exists at the main URL for the page. In step 527, a test is performed to determine whether the preferences in the browser are set to allow dynamic update of bookmarks. Step 529 tests whether the URL matches a bookmark entry in a bookmark set. Note that it does not have to be the active bookmark set. Step 531 determines whether the matched bookmark has a dynamic attribute. If all of these conditions are met, in step 533, the bookmark entry is updated. In step 535, processing of the HTML in the returned document continues to include the new HTTP request to the new server address for the Web page.

Consumer Hotlist Pulldown Bookmarks

The proliferation of commerce on the Web has proceeded explosively, yet somewhat haphazardly. There are many Web designing tools and many Web designing firms, resulting in a bewildering array of user interfaces. However, certain market segments on the Web can now be identified, e.g., travel, finance, retail, electronic gaming. Each of these market segments can be characterized as having a set of common tasks. However, the user's browsing experience varies greatly from site to site. It would be preferable if the user was confronted with a consistent user interface when accessing each web site that caters to a specific market segment.

On many Web sites, an attempt has been made to provide a somewhat rudimentary common interface with features such as "search", "contact-us", etc. The dialog to access these features is found usually at the bottom or top of the Web page. However, the code to manage the dialog is embedded code in the web page. The problem is aggravated when common tasks such as "purchase", "order" and others are implemented using custom dialogs. Each site decides to implement the custom dialog in unique and often obtuse fashions, bewildering the consumer with a plethora of different user interfaces.

In this embodiment of the invention, a web user to utilizes a bookmark set of provided bookmarks for a set of actions, preferably a set of actions common to a particular market segment. The provided bookmark set is used by the bookmark set manager to provide a user interface much like pull down menus to select actions for the web site. Each web site has similar sets of bookmarks as do other sites which offer similar services. The bookmark sets which contain pull down menu items are called "consumer hot lists". In the preferred embodiment, the consumer hot list provides a polymorphic bookmark set, where the name of the bookmark is fixed, but the URL address is dynamic in nature.

A consumer hot list is composed of a consumer "request", a text string for display in the user interface which indicates what will happen if the request is selected and a web "action", a URL to another web page. Examples of consumer requests are generic actions such as "purchase", "feedback", "support", and so forth. As a result of selection of the request, the applicable web action is performed by the web server, i.e. typically redirection to another web document. This consumer hot list is a bookmark set which is downloaded to the browser with the requested web page.

The user experienced with downloaded bookmark sets will quickly gain a basic understanding of the operation of the consumer hot lists. In the preferred embodiment, a standard bookmark set of requests is provided to the browser for each Web page in the same industry. Thus, bookmark sets can be provided by industries such as Clothing, Manufacturing, Software, Banking, Gaming and Education. Further granularity within an industry is allowed.

Typically, a Web server associated with the original Web page serves the Web page which supports a respective action in the consumer hot list. The server creates a named consumer hot list and stores the document using a particular MIME type, e.g., chl/x-consumer-host-list. The MIME type for a temporary dynamic bookmark set could also be used. When the browser retrieves the consumer hot list MIME type, it creates a separate pull down window, listing all the requests supported by this Web page application.

Visiting a different site automatically updates the consumer hot list request and action items.

Some examples of consumer hot lists are given below. The reader will understand that the hot lists below are illustrative and that similar and more extensive lists can be developed for these and other industries.

In the Banking industry, the bookmarks of the consumer hot list pulldown are:

Savings

Checking

Balance Inquiry

Bill Payment

The associated actions are the URLs for Web pages which provide the respective consumer action.

In the Gaming industry, the bookmarks of the consumer hot list pulldown are:

Start Game

Look for Players

Game Options

Levels

In the Retail industry, the bookmarks of the consumer hot list pulldown are:

Purchase

On-Sale Today

Review Order

Review Shopping Cart

Consumer Address

Web browsers are becoming the primary user interface for a personal computer. As Web browsers also provide the primary interfaces for specific market segments, the consumer hot list feature of the present invention makes it possible to provide a consistent interface for each market segment.

The creation of the consumer hot list starts by associating particular requests, common to a market segment, to a custom action or task. For example, the request to specify a Credit Card Purchase is associated with a Web page, which might supply a Credit Card Information form. In the preferred embodiment, the transmission of credit card information and the like is always encrypted. Since the consumer can rely on this fact, the common association of request and encryption eases the consumer fear of sending personal or accounting information in the clear.

An association table is created and embedded in a Web page that is downloaded to the browser when visiting the web site. The receiving browser accepts the consumer hot list association table which is preferably identified via HTML tags and modifies any existing consumer hot list pulldown menu to reflect the current settings. Another embodiment of the invention is to make a consumer hot list a temporary dynamic bookmark set which is only active while the user is at the web site.

An example of an association table with a few examples of associated actions is given below:

Association Table
   <Consumer-Public-Domain>
      <CNSMR-Keyword> Purchase</CNSMR-Kbyword>
      <CNSMR-Action> Form-Purchase</CNSMR-Action>
      <CNSMR-Keyword> On-Sale-Today</CNSMR-Kbyword>
      <CSMR-Action>htt://Sale-Today.html</CNSMR-Action>
      <CNSMR-Keyword>Review-Order<CNSMR-Keyword>
      <CNSMR-Action>http://ReView-Order.html</CNSMR-Action>

The setting of the consumer hot list parameters can remain active until reset by a subsequent visit to a different web site for the same industry. Alternatively, the hot list parameters may be temporary dynamic ones which are removed from the browser at the conclusion of the web site session.

The association table for the current request parameter should be the same, i.e. same keyword for specific industries. For example, all lending libraries would have common requests such as: checkout, reserve, return, extend loan, request library card and so forth. The actions for each request are implemented by each institution using their own web pages and URLs.

Figure 15:
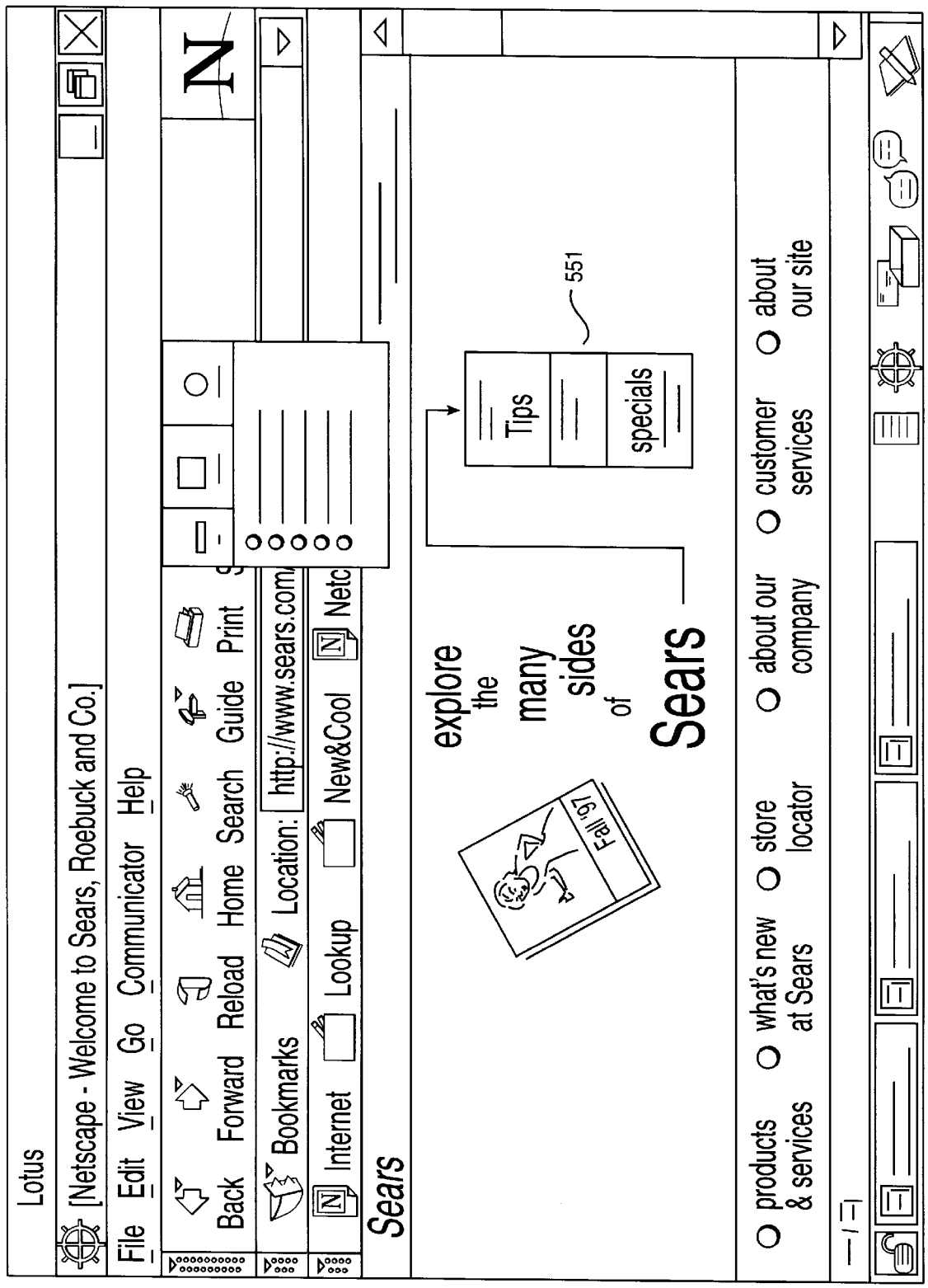
FIG. 15 shows the use of a consumer hot list at a retail web site.

FIG. 15 shows how a consumer hot list 551 can be presented on a retail site like www.sears.com. Notice that the bookmark set 551 includes request items such as Purchase 552, On-Sale Today 553, Review Order 554, Review Shopping Cart 555 and Consumer Address 556. The selection of any of these bookmarks would result in the retreival of a web page which would provide the listed action.

Figure 16:
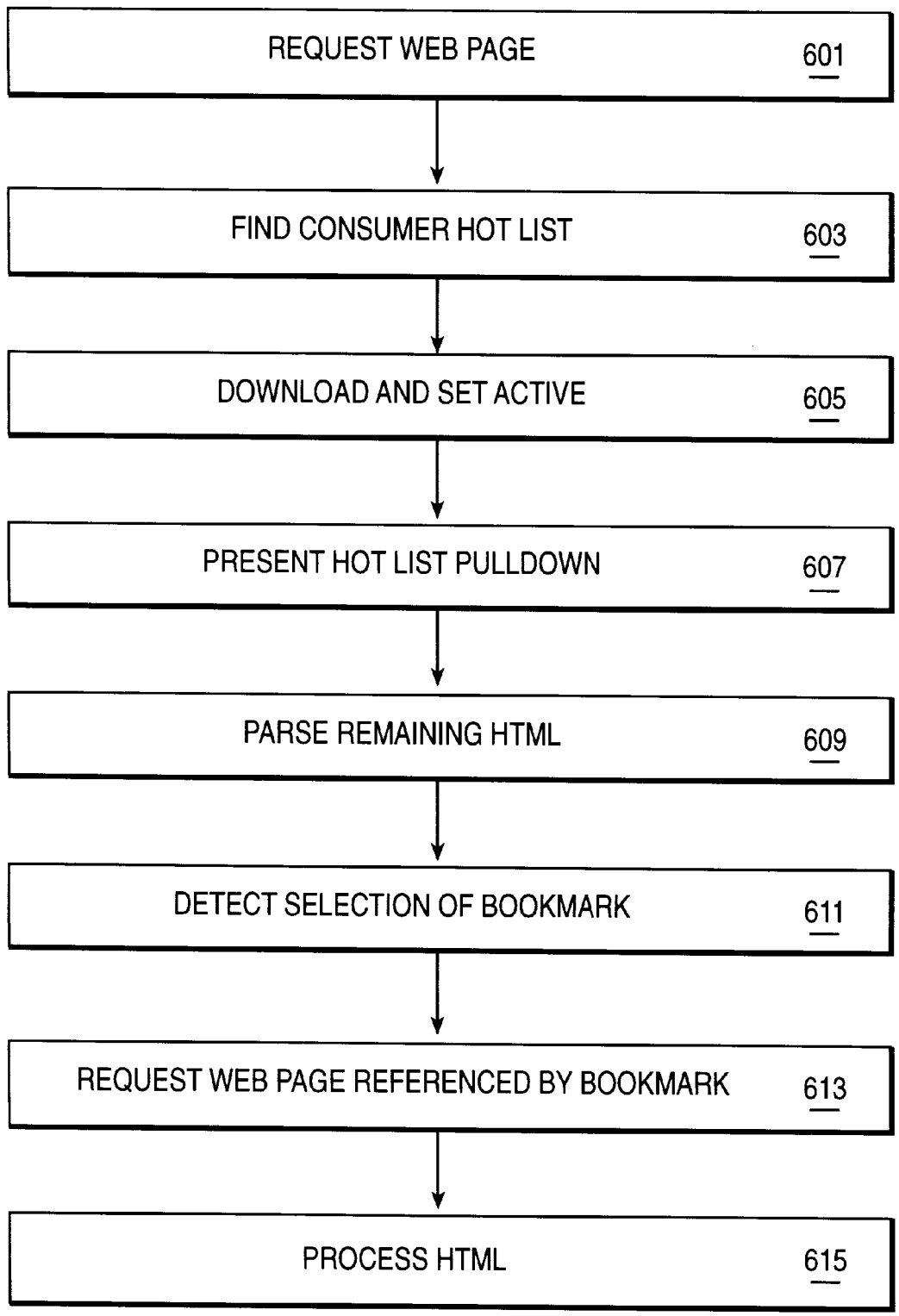
FIG. 16 is a flowchart of the consumer hot list process.

FIG. 16 is a flowchart of the consumer hot list process. In step 601, the browser has requested a web page to be fetched from a web server. In step 603, the browser begins to parse the HTML and determines whether there is a consumer hot list tag in the page. If so, the consumer hot list is downloaded and set as the active bookmark set, step 605. An existing bookmark set may be updated in this step. In step 607, a pulldown is presented to the user containing the consumer hot list bookmarks. In step 609, the remaining HTML in the page is processed by the browser for presentation to the user.

In step 611, the browser detects that the user has selected a bookmark in the consumer hot list. In response the browser retrieves a web page at the URL of the selected item, step 613. In step 615, the browser processes the page as dictated by the HTML.

The embodiments described above have shown the utility of the bookmark set of the present invention. By handling a set of bookmarks as an entity rather than on a one by one basis as done in the prior art, a variety of functions can be accomplished through the use of bookmarks. The bookmark sets can be used to control user access to the web. Attributes of the bookmark entries can be set as a group to provide automatic update of bookmarks, or other functions for the entire set.

Although the discussion above has focused on the use of HTTP and HTML as the most popular protocols in current use in the Web. The invention is not limited to these protocols. Bookmarks can be created for sites using the FTP and gopher protocols. Download of bookmark sets is possible using these protocols as well. While web pages today are primarily written in HTML, other markup languages such as dynamic HTML and XML, or as yet undeveloped languages, will be used in the browsers of the future.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for providing access to the Internet using a plurality of bookmark sets comprising the steps of:

storing a plurality of bookmark sets in a browser, each bookmark set including a respective set of Uniform Resource Locators (URLs);

designating one of the bookmark sets as an active bookmark set in the browser; and allowing browser access to the Internet according to the URLs in the active bookmark set, wherein a request for a file at a designated URL is denied if there is no match between the designated URL and the URLs in the active bookmark set.

2. The method as recited in claim 1, further comprising the steps of:

detecting a request to retrieve an Internet file from a designated URL;

checking the designated URL against the URLs in the active bookmark set;

allowing the request to proceed if there is a match between the designated URL and a respective URL in the active bookmark set; and denying the request if there is no match between the designated URL and a respective URL in the active bookmark set.

3. The method as recited in claim 2 wherein the request is activated by a hyperlink in a web page.

4. The method as recited in claim 1 further comprising the steps of:

creating a bookmark set;

associating one or more passwords with the bookmark set; and requiring entry of an associated password to make the bookmark set the active bookmark set in the browser.

5. The method as recited in claim 1 further comprising the steps of:

creating a bookmark set;

associating one or more passwords with the bookmark set; and requiring entry of an associated password to modify the bookmarks in the bookmark set.

6. The method as recited in claim 5 wherein the step of creating a bookmark set is password protected.

7. The method as recited in claim 1 further comprising the step of changing an attribute of all the bookmarks in a selected bookmark set in a single operation.

8. The method as recited in claim 1 further comprising the step of deleting a bookmark set so that all the bookmarks in a selected bookmark set in a single operation.

9. The method as recited in claim 1 further comprising the steps of:

displaying a list of bookmark sets, wherein only the bookmarks of the active bookmark set are displayed;

designating a new bookmark set as the active set; and displaying the list of bookmark sets, wherein only the bookmarks of the new active bookmark set are displayed.

10. The method as recited in claim 1 further comprising the step of displaying an indicia proximate to each password protected bookmark set in the list of bookmark sets.

11. A system including memory, processor and display for providing access to the Internet using a plurality of bookmark sets comprising:

a browser having a plurality of bookmark, each bookmark set including a respective set of Uniform Resource Locators (URLs);

means for designating a selected one of the bookmark sets within the browser as an active bookmark set in the browser; and wherein the browser allows access to the Internet according to the URLs in the active bookmark set, wherein a request for a file at a designated URL is denied if there is no match between the designated URL and the URLs in the active bookmark set.

12. The system as recited in claim 11, further comprising:

means for detecting a request to retrieve an Internet file from a designated URL; and means for checking the designated URL against the URLs in the active bookmark set;

wherein the browser allows the request to proceed if there is a match between the designated URL and a respective URL in the active bookmark set and denies the request if there is no match between the designated URL and any URL in the active bookmark set.

13. The system as recited in claim 12 wherein the request is activated by a hyperlink in a web page.

14. The system as recited in claim 11 further comprising:

means for creating a bookmark set;

means for associating one or more passwords with the bookmark set; and means for requiring entry of an associated password to make the bookmark set the active bookmark set in the browser.

15. The system as recited in claim 11 further comprising:

means for creating a bookmark set;

means for associating one or more passwords with the bookmark set; and means for requiring entry of an associated password to modify the bookmarks in the bookmark set.

16. The system as recited in claim 11 further comprising:

means for displaying a list of bookmark sets, wherein only the bookmarks of the active bookmark set are displayed;

means for designating a new bookmark set as the active set; and means for displaying the list of bookmark sets, wherein only the bookmarks of the new active bookmark set are displayed.

17. A computer program product for providing access to the Internet using a plurality of bookmark sets comprising:

a browser for retrieving content from the Internet;

means for creating a bookmark set, the bookmark set including a respective set of Uniform Resource Locators (URLs);

means for incorporating the plurality of bookmark sets in the browser;

means for designating a bookmark set as the active set in the browser; and means for allowing access to the Internet according to the URLs in the active set, wherein a request for a file at a designated URL is denied if there is no match between the designated URL and the URLs in the active bookmark set.

18. The product as recited in claim 17, further comprising:

means for detecting a request to retrieve an Internet file from a designated URL;

means for checking the designated URL against the URLs in the active bookmark set;

wherein the product allows the request to proceed if there is a match between the designated URL and a respective URL in the active bookmark set and denies the request if there is no match between the designated URL and any URL in the active bookmark set.

19. The product as recited in claim 17 further comprising:

means for associating one or more passwords with the bookmark set; and means for requiring entry of an associated password to make the bookmark set the active bookmark set in the browser.

20. The product as recited in claim 17 further comprising:

means for associating one or more passwords with the bookmark set; and means for requiring entry of an associated password to modify the bookmarks in the bookmark set.

21. The product as recited in claim 17 further comprising:

means for displaying a list of bookmark sets, wherein only the bookmarks of the active bookmark set are displayed;

means for designating a new bookmark set as the active set; and means for displaying the list of bookmark sets, wherein only the bookmarks of the new active bookmark set are displayed.

22. A computer program product in a computer readable medium for providing limited Internet access comprising:

browsing means for retrieving content from the Internet;

an active bookmark set integrated into the browsing means including a set of URLs to which the browsing means has access;

means for detecting a request to retrieve content from the Internet from a designated URL;

means for checking the designated URL against the URLs in the active bookmark set; and means for allowing the request to proceed if there is a match between the designated URL and a respective URL in the active bookmark set or denying the request if there is no match between the designated URL and any URL in the active bookmark set.

23. The product as recited in claim 22 wherein means for making a request to retrieve content from the Internet is limited to selection from a list of the URLs in the active bookmark set and selection of a hyperlink in a displayed web document.

24. A point of sale kiosk for providing limited Internet access comprising:

a computer system including memory, processor, display, input device and network connection;

a browser resident on the computer system for retrieving content from the Internet, the browser having a single bookmark set including a set of URLs to which the browser has access, wherein the browser includes:

means for detecting a request to retrieve content from the Internet from a designated URL;

means for checking the designated URL against the URLs in the active bookmark set; and means for allowing the request to proceed if there is a match between the designated URL and a respective URL in the active bookmark set or denying the request if there is no match between the designated URL and any respective URL in the active bookmark set.

25. The kiosk as recited in claim 24 wherein means for making a request to retrieve content from the Internet is limited to selection from a list of the URLs in the active bookmark set and selection of a hyperlink in a displayed web document.

* * * * *